US009325475B2

(12) United States Patent
Hoshino et al.

(10) Patent No.: US 9,325,475 B2
(45) Date of Patent: Apr. 26, 2016

(54) TERMINAL, BASE STATION, TRANSMISSION METHOD AND RECEPTION METHOD IN A HETEROGENEOUS NETWORK REGARDING COMP CONTROL OF CHANNEL INFORMATION

(75) Inventors: Masayuki Hoshino, Kanagawa (JP); Hidetoshi Suzuki, Kanagawa (JP); Akihiko Nishio, Osaka (JP); Takashi Tamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 162 days.

(21) Appl. No.: 14/237,056

(22) PCT Filed: Jul. 23, 2012

(86) PCT No.: PCT/JP2012/004652
§ 371 (c)(1),
(2), (4) Date: Feb. 4, 2014

(87) PCT Pub. No.: WO2013/021556
PCT Pub. Date: Feb. 14, 2013

(65) Prior Publication Data
US 2014/0161093 A1 Jun. 12, 2014

(30) Foreign Application Priority Data

Aug. 5, 2011 (JP) ................................. 2011-171711
Sep. 30, 2011 (JP) ................................. 2011-217279

(51) Int. Cl.
*H04L 12/26* (2006.01)
*H04L 5/00* (2006.01)
(Continued)

(52) U.S. Cl.
CPC .............. *H04L 5/0053* (2013.01); *H04B 7/024* (2013.01); *H04B 7/0626* (2013.01);
(Continued)

(58) Field of Classification Search
CPC ... H04L 5/0048; H04L 5/0007; H04L 1/0026; H04W 36/30; H04W 52/241; H04W 52/243
USPC .......................................... 370/252, 315, 203
See application file for complete search history.

(56) References Cited

U.S. PATENT DOCUMENTS 8,599,708 B2 * 12/2013 Chen ..................... H04L 1/0028
370/252
2009/0010319 A1 * 1/2009 Sun ........................ H04L 5/006
375/224

(Continued)

FOREIGN PATENT DOCUMENTS

CN 101911523 A 12/2010
JP 2011-061728 A 3/2011

(Continued)

OTHER PUBLICATIONS

Panasonic, Flexible CoMP Operation based on Dedicated CSI-RS Configuration, 3GPP TSG RAN WG1 Meeting #65 R1-111587, May 13, 2011, p. 1-p. 5.

(Continued)

*Primary Examiner* — Wei Zhao
*Assistant Examiner* — Sai Aung
(74) *Attorney, Agent, or Firm* — Pearne & Gordon LLP

(57) ABSTRACT

The present invention is a terminal capable of suppressing increase in transmit power required for transmitting a CSI report at a terminal while widely securing candidates for motion control. A reception processing unit (203) receives multiple reference signals from multiple transmission points, first information indicating the multiple transmission points, and second information indicating at least one transmission point included in the multiple transmission points; a CSI generation unit (206), on the basis of the first information, generates first channel information including channel information corresponding to each of the multiple reference signals from the multiple transmission points, and on the basis of the second information, generates second channel information including channel information corresponding to the reference signals from the at least one of the transmission points; and a transmission signal formation unit (208) transmits the first channel information and the second channel information which have been generated.

21 Claims, 13 Drawing Sheets

(51) Int. Cl.
*H04W 24/10* (2009.01)
*H04B 7/02* (2006.01)
*H04B 7/06* (2006.01)
*H04L 1/00* (2006.01)
*H04L 1/16* (2006.01)
*H04W 52/14* (2009.01)
*H04W 52/24* (2009.01)

(52) U.S. Cl.
CPC ........... *H04L 1/0026* (2013.01); *H04L 5/0035* (2013.01); *H04W 24/10* (2013.01); *H04L 1/0003* (2013.01); *H04L 1/0009* (2013.01); *H04L 1/0031* (2013.01); *H04L 1/1671* (2013.01); *H04W 52/146* (2013.01); *H04W 52/247* (2013.01)

(56) References Cited

U.S. PATENT DOCUMENTS

| | | | |
|---|---|---|---|
| 2009/0190528 A1 | 7/2009 | Chung et al. | |
| 2009/0219852 A1* | 9/2009 | Youn | H04L 45/00 370/315 |
| 2009/0247084 A1* | 10/2009 | Palanki | H04L 5/0007 455/63.1 |
| 2010/0130212 A1 | 5/2010 | So et al. | |
| 2011/0007653 A1* | 1/2011 | Casaccia | H04L 27/2647 370/252 |
| 2011/0098054 A1 | 4/2011 | Gorokhov et al. | |
| 2011/0116358 A9* | 5/2011 | Li | H04L 5/0007 370/203 |
| 2012/0106374 A1* | 5/2012 | Gaal | H04L 5/0048 370/252 |
| 2012/0172076 A1 | 7/2012 | Seki | |

FOREIGN PATENT DOCUMENTS

| | | |
|---|---|---|
| JP | 2011-509018 A | 3/2011 |
| WO | 2010/048583 A2 | 4/2010 |
| WO | 2011/013989 A2 | 2/2011 |
| WO | 2011/020062 A2 | 2/2011 |

OTHER PUBLICATIONS

Intel Corporation, Uplink Power Control Discussion for CoMP Scenario 4, 3GPP TSG-RAN WG1 #65 R1-111598, May 13, 2011, p. 1-p. 16.

Samsung, "Discussions on CSI-RS port selection for non-uniform networks with low-power nodes", 3GPP TSG RAN WG1 meeting, R1-111469, May 2011.

International Search Report for Application No. PCT/JP2012/004652 dated Aug. 28, 2012.

Supplementary European Search Report for Application No. 12821733.8 dated Apr. 24, 2015.

* cited by examiner

| R | T₁ | T₂ | T₃ | T₄ | T₅ | T₆ | T₇ |
|---|----|----|----|----|----|----|----|

FIG. 6

| T₁₂ | T₁₁ | T₁₀ | T₉ | T₈ | T₇ | T₆ | T₅ |
|---|---|---|---|---|---|---|---|
| T₄ | T₃ | T₂ | T₁ | Serving TP₁ | | | |

FIG. 10

| $T_{12}$ | $T_{11}$ | $T_{10}$ | $T_9$ | $T_8$ | $T_7$ | $T_6$ | $T_5$ |
|---|---|---|---|---|---|---|---|
| $T_4$ | $T_3$ | $T_2$ | $T_1$ | Reference $TP_i$ | | | |

FIG. 14

| $T_8$ | $T_7$ | $T_6$ | $T_5$ | $T_4$ | $T_3$ | $T_2$ | $T_1$ |
|---|---|---|---|---|---|---|---|
| $P_0\_PUCCH$ | | | | $P_0\_PUSCH$ | | | |

FIG. 15

TERMINAL, BASE STATION, TRANSMISSION METHOD AND RECEPTION METHOD IN A HETEROGENEOUS NETWORK REGARDING COMP CONTROL OF CHANNEL INFORMATION

TECHNICAL FIELD

The present invention relates to a terminal, a base station, a transmission method and a reception method.

BACKGROUND ART

The 3rd Generation Partnership Project Radio Access Network Long Term Evolution (hereinafter, referred to as "LTE") and LTE-Advanced which is an evolved version of LTE (hereinafter, referred to as "LTE-A") employ orthogonal frequency division multiple access (OFDMA) for the downlink communication scheme.

For frequency scheduling and link adaptation in OFDMA, each terminal (may also be referred to as "UE (User Equipment)") measures channel information (CSI: Channel State Information) and reports channel information (CSI measurement result) to a base station (may also be referred to as "eNB"). On the other hand, the base station allocates appropriate resources to the terminal using channel information (CSI measurement result).

In LTE, CSI measurement is performed using cell-specific reference signals (CRS). CRS is transmitted in all subframes. The terminal can observe CRS at the time of establishing synchronization.

On the other hand, in LTE-A, CSI measurement is performed using CSI-RS (reference signal for channel quality measurement). It should be noted that since LTE-A is a system which has been extended while maintaining backward compatibility with LTE, CSI-RS which is an LTE-A-specific reference signal is allocated in both time and frequency domains at a low density to minimize insertion loss of CSI-RS. For this reason, the terminal needs to acquire CSI-RS-related parameters as information broadcasted within a cell (broadcast information) by the time CSI-RS allocated at a low density is observed. As CSI-RS-related parameters, the number of transmitting antennas, the positions of time/frequency resources within a subframe and a transmission period and subframe offset or the like are defined.

In LTE, there are two types of operation of CSI measurement and CSI reporting: operation of periodically performing CSI reporting (hereinafter, referred to as "periodic CSI reporting") and operation of aperiodically performing CSI reporting ("aperiodic CSI reporting").

In periodic CSI reporting, the terminal performs CSI measurement according to one previously indicated measurement operation out of a plurality of measurement operations in preparation for reporting using defined uplink resources (e.g., uplink control channels), allocates the CSI measurement results to the uplink control channels and reports the CSI measurement results to the base station. An example of measurement operation is CSI reporting assuming closed-loop MIMO (Multiple Input Multiple Output) control. This CSI reporting employs operation of measuring and reporting RI (Rank Indicator) indicating a spatial multiplexing number, a wideband desired precoding matrix (PMI: Precoding Matrix Indicator) and wideband channel quality information (CQI: Channel Quality Indicator). That is, CSI is made up of RI, wideband PMI and wideband CQI.

In aperiodic CSI reporting as well as periodic CSI reporting, the terminal performs CSI measurement according to one previously indicated measurement operation. However, aperiodic CSI reporting is different from periodic CSI reporting in that the terminal reports CSI at timing instructed from the base station and the terminal reports CSI using resources on a common data channel.

As the aforementioned method of previously indicating the measurement operation, a method using a radio resource control message (RRC signaling) is available. Furthermore, aperiodic CSI reporting is instructed through allocation of an uplink data channel (e.g., PUSCH) using a downlink control channel (e.g., PDCCH).

It should be noted that different measurement operations may be indicated in periodic CSI reporting and aperiodic CSI reporting. For example, while RI, wideband PMI and wideband CQI are reported in periodic CSI reporting as described above, RI, wideband PMI and narrow band CQI can also be reported in aperiodic CSI reporting. That is, in aperiodic CSI reporting, narrow band CSI is reported instead of wideband CQI in periodic CSI reporting. In this case, it is possible to use different operations: referencing periodic CSI reporting for rough link adaptation application when transmitting not urgent data and referencing aperiodic CSI reporting for detailed link adaptation application when transmitting urgent data.

In LTE-A, an operation has been added whereby two types of previously indicated measurement targets are respectively reported in periodic CSI reporting. In LTE-A, an operation has been further added whereby two types of previously indicated measurement targets are associated with timings instructed from a base station also in aperiodic CSI reporting, and reporting corresponding to one of the two types of measurement targets is performed at each timing. The two types of measurement targets are indicated using RRC signaling according to a bit-map corresponding to 40 consecutive subframes.

Furthermore, in LTE-A, a concept of carrier aggregation has been introduced, the number of instruction bits for aperiodic CSI reporting has been expanded to 2 bits, and an operation of measuring and reporting two types of previously indicated component carrier groups can be adopted in addition to the operation of measuring and reporting component carriers instructed to be reported.

Moreover, studies on operation of coordinated multiple transmission point (CoMP) are being carried out. CoMP is a technique whereby a plurality of base stations (which may also be referred to as "cell," "eNB" or "transmission point") cooperate to transmit signals to a terminal (UE) and several schemes are under study. Examples of main CoMP schemes under study in 3GPP include two schemes: (1) coordinated beam forming (CB) scheme and (2) joint transmission (JT) scheme.

The CB scheme is a scheme whereby data to a certain terminal is possessed by only a specific base station (cell). That is, for the terminal, signals from a cell that possesses no data intended for the terminal (e.g., a cell adjacent to the cell to which the terminal is connected) are regarded as interference. The CB scheme adopts a method of reducing inter-cell interference by controlling transmission parameters. More specifically, examples of transmission parameters include precoding, transmission power, modulation scheme and coding rate. By appropriately controlling these transmission parameters, it is possible to weaken signals from an interference cell (a cell that possesses no data intended for the terminal) for the terminal while strengthening signals from a desired cell (a cell that possesses data intended for the terminal).

On the other hand, the JT scheme is a scheme in which data to a certain terminal is shared by a plurality of base stations (cells). Thus, a plurality of base stations can simultaneously transmit signals intended for the corresponding terminal. For this reason, since the terminal can handle signals from other cells not as interference signals but as desired signals, the SINR observed at the terminal can be expected to improve. Furthermore, improving a method of generating precoding weights in a plurality of cells as an operation within a network allows a large performance improvement to be achieved.

For such CoMP control, there is a method of observing channel information between the terminal and each cell to be targets of CoMP control and reporting the information as channel information in cell units (transmission point units) to the network.

A transmission point from a viewpoint of observing such channel information may also be called "CSI-RS-Resource" as an entity that transmits the aforementioned CSI-RS.

In addition, there is a heterogeneous network using a plurality of base stations having coverage areas different in size. The heterogeneous network is a network in which a macro base station that covers a large coverage area (called a "macrocell," "HPN (High Power Node)" or "Macro eNB" in some cases) and a pico base station that covers a small coverage area (called a "picocell" or "Low Power Node (LPN)" or "Pico-eNB" in some cases) are used together. A method has been discussed by which mobility control (handover) is easily realized using the signal of the physical layer by giving the same identification number (cell ID) as a macrocell to a picocell disposed in the coverage area of the macrocell in the heterogeneous network. For the operation of such a heterogeneous network, a method is under study whereby channel information (CSI) measured by an LTE-A compliant terminal (hereinafter, referred to as "LTE-A terminal") using CSI-RS newly added for the LTE-A terminal is reported to the network to select optimal transmission and reception points according to the propagation state (for example, refer to FIG. 1 and NPL 1).

Moreover, applying CoMP in a heterogeneous network is also being discussed. For example, receiving quality in UE can be expected to improve by applying CoMP such as a CB scheme or JT scheme between LPN1 and Macro eNB shown in FIG. 1.

CITATION LIST

Non-Patent Literature

NPL 1
3GPP TSG RAN WG1 meeting, R1-111469, Samsung, "Discussions on CSI-RS port selection for non-uniform networks with low-power nodes", May 2011

SUMMARY OF INVENTION

Technical Problem

Simply combining mobility control in the aforementioned physical layer and CoMP control involves the following problems in channel information reporting.

In a heterogeneous network where mobility control in the physical layer is assumed, quality of all base stations (cells) located in the same macrocell region (coverage area of a macro base station) may be reported to a network in order to make the most of advantages of simple control. For example, in FIG. 2, quality of Macro eNB, LPN1, LPN2 and LPN3 may be reported to a network.

Regarding CoMP control, since relatively detailed channel information (CSI) such as precoding and CQI in each subband is necessary, reporting of detailed channel information (CSI) for each base station is required.

Reporting the detailed channel information (CSI) on all base stations located in the same macrocell region may cause the amount of data of uplink signals necessary for reporting the channel information to increase, resulting in a problem that transmission power necessary for a terminal to transmit those uplink signals increases.

In order to avoid this problem, it is also possible to limit reporting targets of channel information by indicating individual radio resource control information (RRC signaling). However, since it generally takes a long time to update the radio resource control information, a control delay may increase and the aforementioned advantage of applying mobility control in the physical layer may be reduced.

Furthermore, from the standpoint of CoMP control, only a specific cell (transmission point) is more likely to contribute to the improvement of receiving quality associated with data transmission intended for a certain terminal (UE). More specifically, in FIG. 2, a signal from the Macro eNB having large transmission power and LPN1 located in the vicinity of the UE may contribute to a quality improvement in the UE located in the vicinity of LPN1, whereas signals from LPN2 and LPN3 located at a sufficiently large distance hardly contribute to any quality improvement. That is, in FIG. 2, sufficient quality improvement is obtained through CoMP control exercised by only the Macro eNB and LPN1. However, as described above, when a combination of mobility control in the physical layer and CoMP control is considered, the UE shown in FIG. 2 needs to measure and report channel information (CSI) for not only Macro eNB and LPN1 but also LPN2 and LPN3, which may increase the likelihood of unnecessary interference in the uplink and suppress the capacity.

An object of the present invention is to provide a terminal, a base station, a transmission method and a reception method capable of preventing an increase in transmission power necessary to transmit a CSI report in a terminal while securing a wide range of mobility control candidates.

Solution to Problem

A terminal according to an aspect of the present invention includes: a receiving section that receives a plurality of reference signals from a plurality of transmission points, first information indicating the plurality of transmission points and second information indicating at least one of some of the plurality of transmission points; a generating section that generates a first channel information part including channel information parts respectively corresponding to the plurality of reference signals from the plurality of transmission points, based on the first information and that generates second channel information part including channel information parts corresponding to the reference signals from the some transmission points, based on the second information; and a transmitting section that transmits the generated first channel information and second channel information parts.

A base station according to an aspect of the present invention includes: a configuration section that configures a plurality of transmission points and at least one of some of the plurality of transmission points; a transmitting section that transmits to a terminal, first information indicating the plurality of transmission points and second information indicating the some transmission points; and a receiving section that receives a first channel information part including channel information parts respectively corresponding to a plurality of reference signals from the plurality of transmission points generated in the terminal based on the first information and second channel information part including channel information parts corresponding to reference signals from the some transmission points generated in the terminal based on the second information.

A transmission method according to an aspect of the present invention includes: receiving a plurality of reference signals from a plurality of transmission points; receiving first information indicating the plurality of transmission points; generating and transmitting a first channel information part including channel information parts respectively corresponding to the plurality of reference signals from the plurality of transmission points based on the first information; receiving second information indicating at least one of some of the plurality of transmission points; and generating and transmitting a second channel information part including channel information parts corresponding to the reference signals from the some transmission points based on the second information.

A reception method according to an aspect of the present invention includes: configuring a plurality of transmission points and transmitting first information indicating the plurality of transmission points to a terminal; receiving a first channel information part including channel information parts respectively corresponding to a plurality of reference signals from the plurality of transmission points generated in the terminal based on the first information; configuring at least one of some of the plurality of transmission points and transmitting second information indicating the some transmission points to the terminal; and receiving a second channel information part including channel information parts corresponding to reference signals from the some transmission points generated in the terminal based on the second information.

Advantageous Effects of Invention

According to the present invention, it is possible to prevent an increase in transmission power necessary to transmit a CSI report in a terminal while securing a wide range of mobility control candidates.

BRIEF DESCRIPTION OF DRAWINGS

FIG. 6 is a diagram illustrating an example of MAC CE according to Embodiment 1 of the present invention;

FIG. 10 is a diagram illustrating an example MAC CE according to Embodiment 5 of the present invention;

FIG. 14 is a diagram illustrating an example of MAC CE according to Embodiment 9 of the present invention; and FIG. 15 is a diagram illustrating an example of MAC CE according to Embodiment 10 of the present invention.

DESCRIPTION OF EMBODIMENTS

Figure 1:
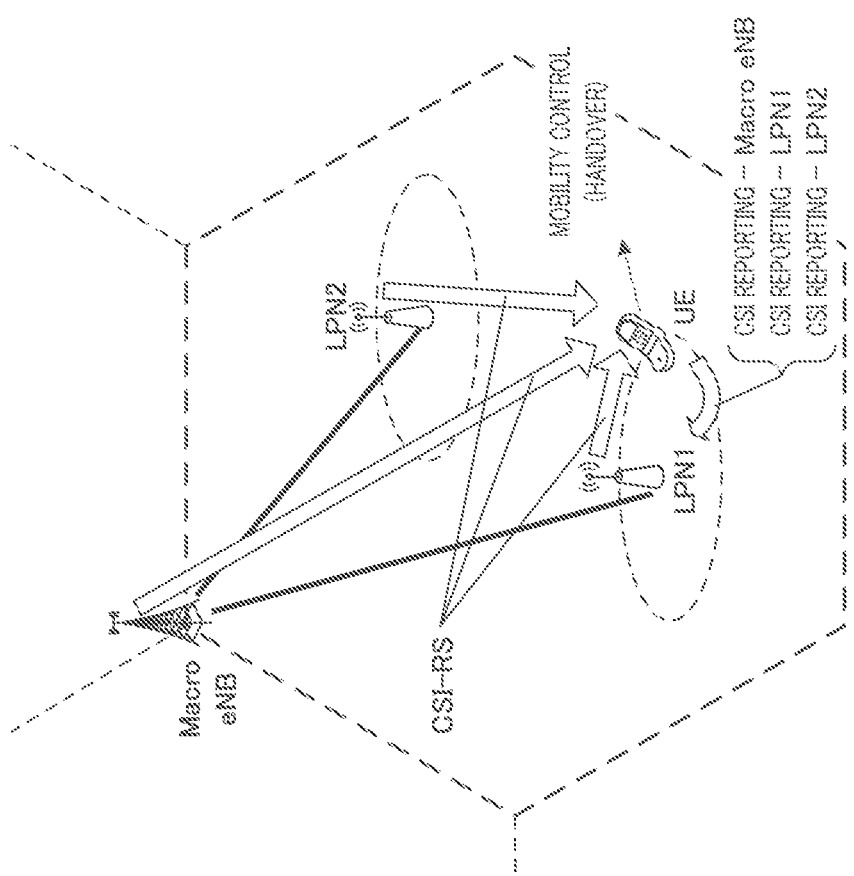
FIG. 1 is a diagram provided for describing mobility control in a heterogeneous network.
Figure 2:
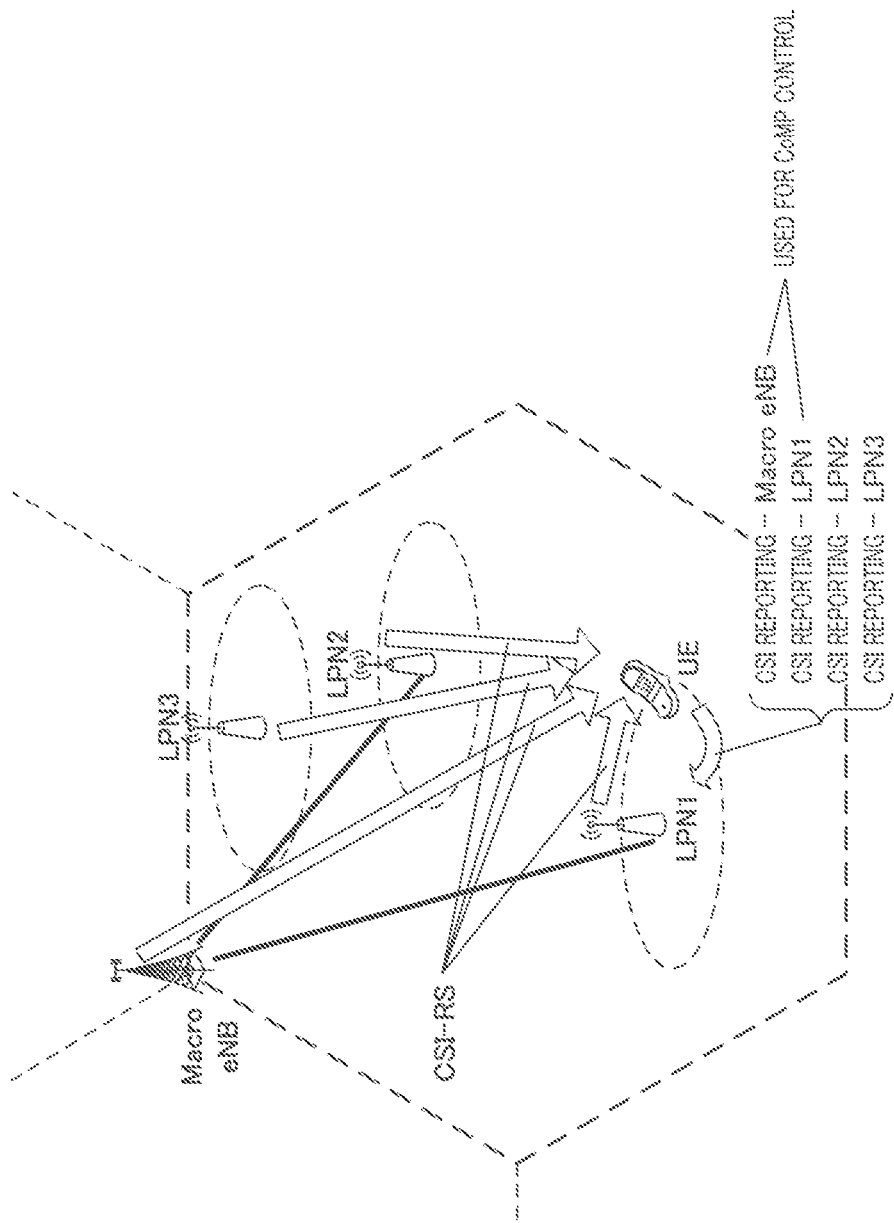
FIG. 2 is a diagram provided for describing a problem that occurs when mobility control in a physical layer is combined with CSI reporting of CoMP control.

Hereinafter, embodiments of the present invention will be described in detail with reference to the drawings. Throughout the embodiments, the same elements are assigned the same reference numerals and any duplicate description of the elements is omitted.

[Embodiment 1]

[Overview of Communication System]

A communication system according to Embodiment 1 of the present invention includes base station 100 and terminals 200. Base station 100 is an LTE-A compliant base station and terminals 200 are LTE-A compliant terminals.

Figure 3:
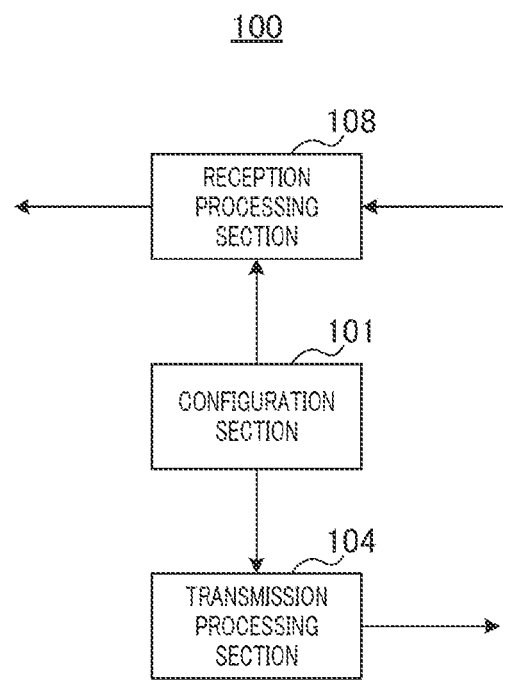
FIG. 3 is a main configuration diagram of a base station according to Embodiment 1 of the present invention.

FIG. 3 is a main configuration diagram of base station 100 according to Embodiment 1 of the present invention. In base station 100, configuration section 101 configures a plurality of transmission points and at least one of some of the plurality of transmission points, transmission processing section 104 transmits first information indicating a plurality of transmission points and second information indicating the some transmission points to terminal 200, and reception processing section 108 receives a first channel information part including channel information parts respectively corresponding to a plurality of reference signals (CSI-RS) from the plurality of transmission points generated in terminal 200 based on the first information, and second channel information part including channel information parts corresponding to the reference signals (CSI-RS) from the some transmission points generated in terminal 200 based on the second information.

Figure 4:
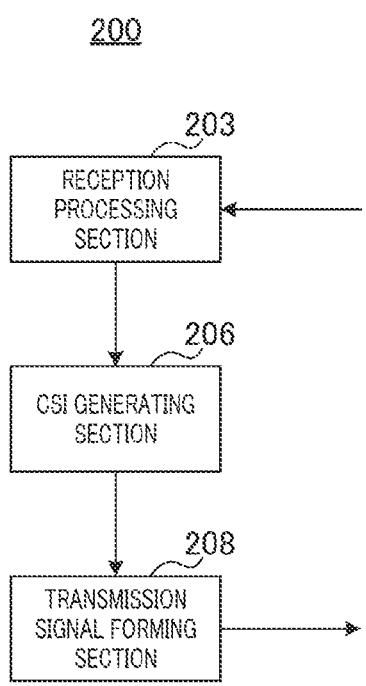
FIG. 4 is a main configuration diagram of a terminal according to Embodiment 1 of the present invention.

FIG. 4 is a main configuration diagram of terminal 200 according to Embodiment 1 of the present invention. In terminal 200, reception processing section 203 receives a plurality of reference signals (CSI-RS) from a plurality of transmission points, first information indicating the plurality of transmission points, and second information indicating at least one of some of the plurality of transmission points, CSI generating section 206 generates a first channel information part including channel information parts respectively corresponding to a plurality of reference signals from the plurality of transmission points, based on the first information and that generates second channel information part including channel information parts corresponding to the reference signals from the some transmission points, based on the second information, and transmission signal forming section 208 transmits the generated first channel information and second channel information parts.

Hereinafter, a description will be provided with an assumption that an FDD system, which divides the uplink from downlink in frequency domain, is employed. However, without being limited to this, terminal 200 may also be configured in a TDD system which divides the uplink from downlink in time domain, and in which terminal 200 reports channel information to base station 100.

Hereinafter, a configuration in which a macrocell and a picocell are formed by single base station 100 will be described. However, a configuration in which a macrocell and a picocell are formed by a plurality of base stations 100 and both are operated cooperatively by sharing a signal appropriately, may be adopted without being limited to the above configuration.

[Configuration of Base Station 100]

Figure 5:
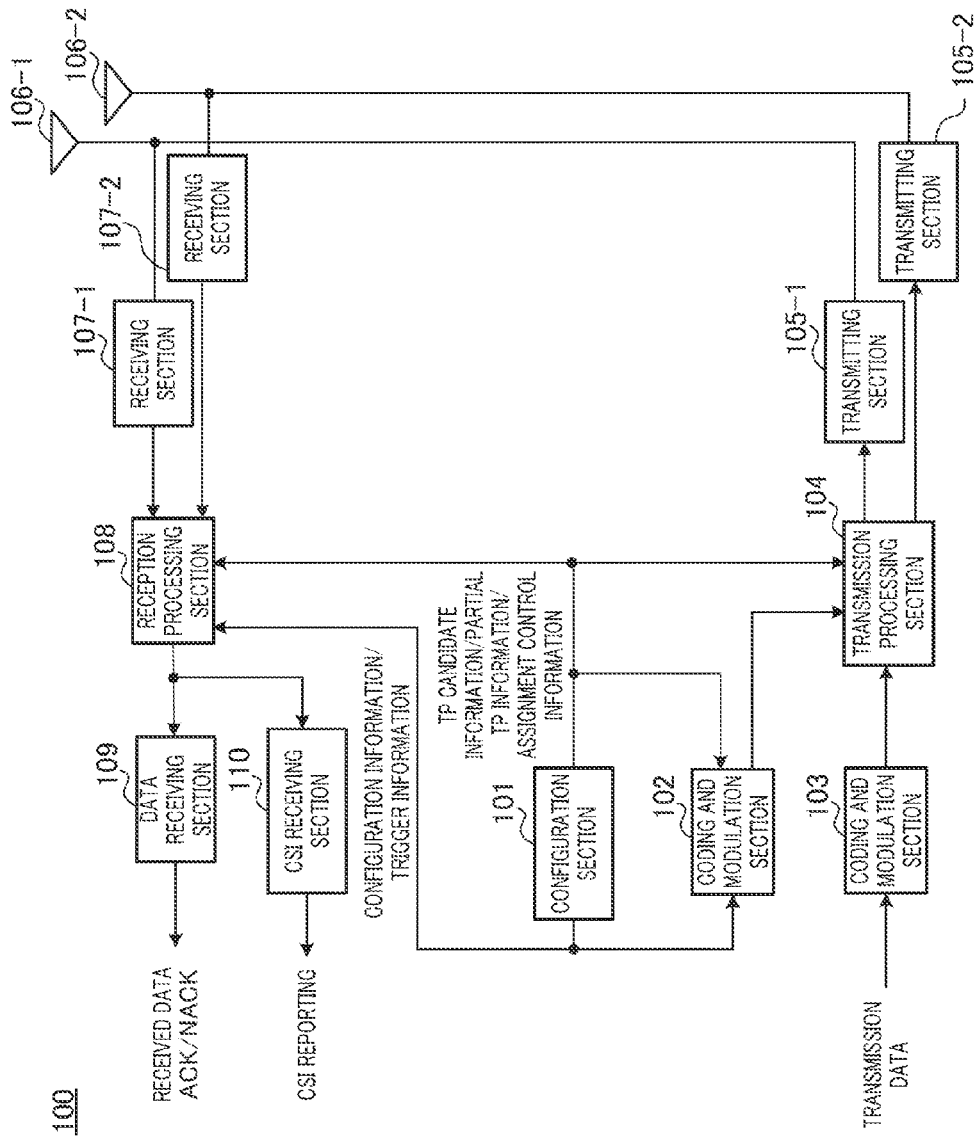
FIG. 5 is a block diagram illustrating a configuration of the base station according to Embodiment 1 of the present invention.

FIG. 5 is a block diagram illustrating a configuration of base station 100 according to Embodiment 1 of the present invention. In FIG. 5, base station 100 includes configuration section 101, coding and modulation sections 102 and 103, transmission processing section 104, transmitting sections 105-1 and 105-2, antennas 106-1 and 106-2, receiving sections 107-1 and 107-2, reception processing section 108, data receiving section 109, and CSI receiving section 110.

For terminal 200 which is to report a CSI (hereinafter referred to as "CSI report terminal"), configuration section 101 generates "TP candidate information" indicating a plurality of transmission points (TPs) that can be connection destination candidates for CSI report terminal 200. The TP candidate information includes for each transmission point, parameters such as the number of antennas, resource positions, transmission timings of reference signals as information relating to transmission points (TPs) which become candidates for mobility control. That is, configuration section 101 configures parameters necessary to measure channel information (CSI) for each transmission point for CSI report terminal 200. For example, configuration section 101 configures transmission points (CoMP resource management set) which become mobility control candidates as transmission points included in TP candidate information by using reported values of CRS observation results in the terminals and referencing setting position information of each TP possessed by base station 100.

Configuration section 101 generates "partial TP information" indicating at least one of some transmission points of a plurality of transmission point candidates included in the TP candidate information for CSI report terminal 200. For example, configuration section 101 configures transmission points (CoMP measurement set) to be targets of CoMP control from among the plurality of transmission point candidates as transmission points included in the partial TP information.

As described above, the TP candidate information and the partial TP information generated by configuration section 101 are respectively subjected to transmission processing as configuration information in coding and modulation section 102, transmission processing section 104, and transmitting section 105 and transmitted to CSI report terminal 200.

Figure 6:
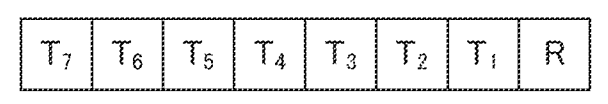

Information on radio resource control (RRC signaling) can be used as control information for indicating the TP candidate information. Furthermore, the partial TP information may also be indicated using MAC Control Element (MAC CE). Control information is embedded in MAC CE as a header to be added in a MAC layer. In this case, in the partial TP information, a bit-map corresponding to each transmission point may be used to indicate whether or not each transmission point corresponds to one of the some transmission points. That is, the "partial TP information" indicating the some transmission points (base stations) is bit-map based information indicating which transmission points of the plurality of transmission point candidates are the some transmission points. More specifically, FIG. 6 illustrates a bit-map that respectively associates bits with seven transmission points $T_i$ where index i=1 to 7. In FIG. 6, when a bit of TP index i representing transmission point $T_i$ is '1,' this means that transmission point $T_i$ corresponds to one of the some transmission points (e.g., CoMP measurement set) and when a bit of TP index i is '0,' this means that transmission point $T_i$ corresponds to none of the some transmission points (e.g., transmission point other than CoMP measurement set).

Configuration section 101 transmits the TP candidate information and the partial TP information to CSI report terminal 200 via coding and modulation section 102 and also outputs it to reception processing section 108.

In addition, configuration section 101 transmits a request for reporting of downlink channel information (hereinafter, referred to as downlink CSI reporting or called downlink CSI feedback in some cases) to terminal 200, which is to be subjected to mobility control in a physical layer in the heterogeneous network described above, the reporting being based on measurement for a downlink channel between each of a plurality of transmission and reception points (a plurality of cells) and the terminal. This reporting (i.e. request for reporting downlink CSI) is indicated as higher layer information. This downlink CSI reporting can be performed at a periodic timing or at an optional timing (aperiodically) based on trigger information. It should be noted that the trigger information is included in a downlink control channel (PDCCH), for example.

Furthermore, configuration section 101 generates assignment control information including resource (RB) assignment information and MCS information corresponding to one or a plurality of transport blocks (TBs). Examples of the assignment control information include assignment control information relating to an uplink resource to which uplink data is assigned (e.g., PUSCH (Physical Uplink Shared Channel)) and assignment control information relating to a downlink resource to which downlink data is assigned (e.g., PDSCH (Physical Downlink Shared Channel)). The assignment control information is outputted to transmission processing section 104 and reception processing section 108, and is also indicated from base station 100 to terminal 200 using PDCCH.

Coding and modulation section 102 encodes and modulates the configuration information (including TP candidate information and partial TP information), trigger information and assignment control information received from configuration section 101 and outputs the modulated signal obtained to transmission processing section 104.

Coding and modulation section 103 encodes and modulates an inputted data signal (transmission data) and outputs the modulated signal obtained to transmission processing section 104.

Transmission processing section 104 forms transmission signals by mapping the modulated signals to be received from coding and modulation sections 102 and 103 to the resources indicated by the downlink resource assignment information received from configuration section 101. In a case where the transmission signals are OFDM signals, OFDM signals are formed by mapping the modulated signals to the resources indicated by the downlink resource assignment information to be received from configuration section 101, transforming the mapped signals into a time waveform by inverse fast Fourier transform (IFFT), and adding cyclic prefix (CP) to the resultant signals.

Transmitting section 105-1 or 105-2 performs radio transmission processing (e.g., up-conversion, digital to analog (D/A) conversion, and/or the like) on the transmission signals received from transmission processing section 104 and transmits the resultant signals via antenna 106-1 or 106-2.

Receiving section 107-1 and 107-2 perform radio reception processing (e.g., down-conversion, analog to digital (A/D) conversion, and/or the like) on the radio signals received via antenna 106-1 or 106-2 and outputs the obtained received signals to reception processing section 108.

In addition, in a plurality of transmission/reception sections and antennas provided in FIG. 5, for example, transmitting section 105-1, receiving section 107-1, and antenna 106-1 may be used to form a macrocell, and transmitting section 105-2, receiving section 107-2, and antenna 106-2 may be used to form a picocell.

Base station 100 transmits a CSI-RS from antenna 106 corresponding to each cell based on CSI-RS-related parameters (CSI-RS configuration) configured for each transmission point (macrocell and picocell).

Reception processing section 108 identifies the resources to which the uplink data signals and ACK/NACK information are mapped, on the basis of the uplink resource assignment information received from configuration section 101 and extracts a signal component mapped to the identified resources from the received signals.

Furthermore, reception processing section 108 identifies resources to which CSI reports are mapped based on the configuration information including TP candidate information, partial TP information and trigger information received from configuration section 101, and extracts signal components mapped to the identified resources from the received signal. More specifically, for periodic CSI reporting, reception processing section 108 receives CSI reports using the identified resources in specified subframes. On the other hand, for aperiodic CSI reporting, reception processing section 108 receives the CSI reports using the identified resources in a subframe located four subframes after the subframe in which trigger information is transmitted. It should be noted that when receiving a CSI report, reception processing section 108 identifies whether CSI reports corresponding to all transmission points indicated in the TP candidate information are included or only CSI reports corresponding to transmission points indicated in the partial TP information are included, and extracts signal components of the CSI reports.

That is, reception processing section 108 receives CSI including CSI respectively corresponding to a plurality of CSI-RSs from a plurality of transmission points generated based on the TP candidate information in terminal 200 and CSI including CSI corresponding to CSI-RSs from some transmission points generated based on the partial TP information (and trigger information) in terminal 200 at predetermined timing (periodic or aperiodic timing).

In a case where the received signals are spatially multiplexed signals (i.e., multi-codeword (CW) transmission), reception processing section 108 demultiplexes the signals for each CW. In addition, in a case where the received signals are OFDM signals, reception processing section 108 performs an inverse discrete Fourier transform (IDFT) on the extracted signal component to transform the OFDM signals into time-domain signals.

The uplink data signals and ACK/NACK information extracted by reception processing section 108 as described above are outputted to data receiving section 109 while the CSI is outputted to CSI receiving section 110.

Data receiving section 109 decodes the signals received from reception processing section 108. The uplink data and ACK/NACK information are thus obtained.

CSI receiving section 110 demodulates the signals received from reception processing section 108. The CSI is thus obtained. Base station 100 performs scheduling and link adaptation based on the CSI of each received transmission point.

[Configuration of Terminal 200]

Figure 7:
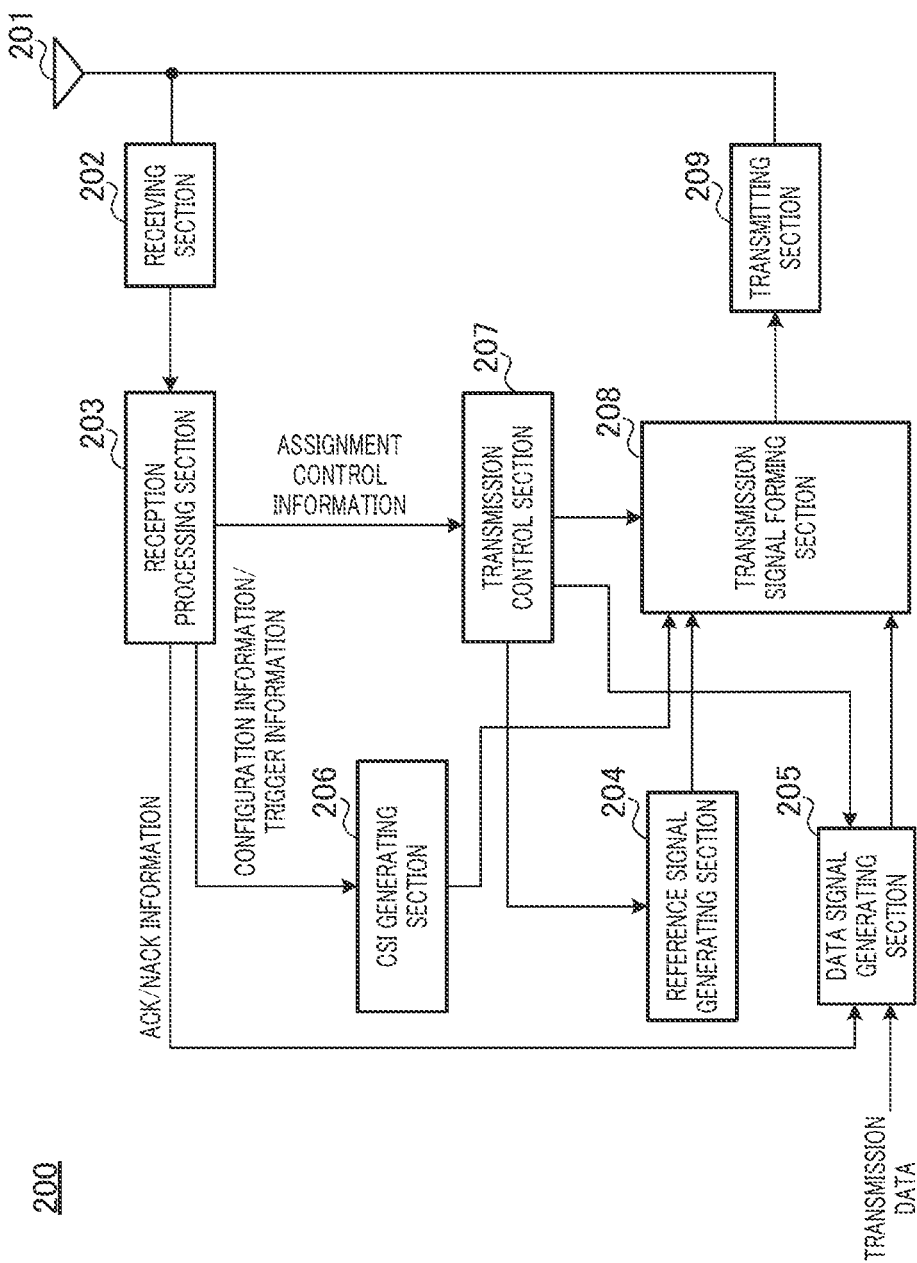
FIG. 7 is a block diagram illustrating a configuration of the terminal according to Embodiment 1 of the present invention.

FIG. 7 is a block diagram illustrating the configuration of terminal 200 according to Embodiment 1 of the present invention. Terminal 200 herein is an LTE-A compliant terminal.

In FIG. 7, terminal 200 includes antenna 201, receiving section 202, reception processing section 203, reference signal generating section 204, data signal generating section 205, CSI generating section 206, transmission control section 207, transmission signal forming section 208 and transmitting section 209.

Receiving section 202 performs radio reception processing (e.g., down-conversion, analog to digital (A/D) conversion, and/or the like) on the radio signals received via antenna 201 and outputs the obtained received signals to reception processing section 203.

Reception processing section 203 extracts the configuration information (TP candidate information and partial TP information), assignment control information, trigger information, and data signals included in the reception signals. It should be noted that the TP candidate information and partial TP information are previously indicated to terminal 200 from base station 100 and shared between base station 100 and terminal 200. Furthermore, reception processing section 203 outputs assignment control information to transmission control section 207. Furthermore, reception processing section 203 outputs the configuration information and trigger information to CSI generating section 206. Moreover, reception processing section 203 performs error detection processing on the extracted data signals and outputs ACK/NACK information in accordance with the result of error detection to data signal generating section 205. Reception processing section 203 extracts the reference signals (e.g., CSI-RS) from the received signals based on the TP candidate information in the configuration information and outputs the reference signals to CSI generating section 206.

Upon receipt of an instruction to generate a reference signal (e.g., sounding reference signal (SRS)) from transmission controlling section 207, reference signal generating section 204 generates and outputs reference signals (SRS) to transmission signal forming section 208.

Data signal generating section 205 receives the ACK/NACK information and transmission data and generates data signals by encoding and modulating the ACK/NACK information and transmission data on the basis of MCS information received from transmission controlling section 207. For non-MIMO transmission, data signals are generated using a single codeword (CW) while data signals are generated using two code words for MIMO transmission. It should be noted that data signal generating section 205 also performs CP removal processing and FFT processing when the received signals are OFDM signals.

CSI generating section 206 generates CSI (channel information) based on TP candidate information, partial TP information and trigger information. More specifically, when periodic CSI reporting is configured, CSI generating section 206 generates CSI through CSI measurement using CSI-RSs from all transmission points included in the TP candidate information at timing of CSI reporting of all transmission points included in the TP candidate information. On the other hand, at timing of CSI reporting of transmission points indicated in the partial TP information, CSI generating section 206 generates CSI through CSI measurement using CSI-RSs from transmission points indicated in the partial TP information.

When aperiodic CSI reporting is configured, upon receipt of trigger information corresponding to CSI reporting of all transmission points included in the TP candidate information, CSI generating section 206 generates CSI through CSI measurement using CSI-RSs from all transmission points included in the TP candidate information. On the other hand, upon receipt of trigger information corresponding to CSI reporting of transmission points indicated in the partial TP information, CSI generating section 206 generates CSI through CSI measurement using CSI-RSs from transmission points indicated in the partial TP information.

That is, CSI generating section 206 generates CSI including CSI respectively corresponding to a plurality of CSI-RSs from a plurality of transmission points based on the TP candidate information and generates CSI including CSI corresponding to CSI-RSs from some transmission points based on the partial TP information (and trigger information). CSI generating section 206 outputs the generated CSI to transmission signal forming section 208.

Transmission controlling section 207 identifies "data mapping resources," to which data signals are mapped, on the basis of the assignment control information to be received from reception processing section 203. Transmission controlling section 206 outputs information about the data mapping resources (hereinafter, may be referred to as "data mapping resource information") to transmission signal forming section 208 and also outputs MCS information included in the assignment control information to data signal generating section 205.

Transmission signal forming section 208 maps the reference signals received from reference signal generating section 204 to the reference signal mapping resources. Transmission signal forming section 208 maps the data signals received from data signal generating section 205 to the data mapping resources indicated by the data mapping resource information. Transmission signal forming section 208 maps the CSI reporting received from CSI generating section 206 to the CSI reporting mapping resources. Transmission signals are generated in the manner described above. It should be noted that, for Non-MIMO transmission, single codeword data signals are assigned to a single layer while two codeword data signals are assigned to a plurality of layers for MIMO transmissions. Meanwhile, when the transmission signals are OFDM signals, transmission signal forming section 208 performs a discrete Fourier transform (DFT) on the data signals and maps the resultant data signals to the data mapping resources. Furthermore, CP is added to the transmission signals thus formed.

Transmitting section 209 performs radio transmission processing (e.g., up-conversion, digital to analog (D/A) conversion, and/or the like) on the transmission signal formed by transmission signal forming section 208 and thereafter transmits the processed signals via antenna 201.

(Operations of Base Station 100 and Terminal 200)

A description will be provided regarding operations of base station 100 and terminal 200 respectively including the abovementioned configurations.

In base station 100, configuration section 101 generates TP candidate information indicating a plurality of transmission candidate points (TP candidates) to be candidates for mobility control of CSI report terminal 200 for CSI report terminal 200. Furthermore, configuration section 101 generates partial TP information indicating at least one of some transmission points of a plurality of transmission point candidates for CSI report terminal 200.

For example, configuration section 101 configures four transmission points of Macro eNB, LPN1, LPN2 and LPN3 as TP candidates (connection destination candidates). Moreover, for example, configuration section 101 configures only LPN1 among the four transmission points of TP candidates as partial TP information.

The configuration information including TP candidate information and partial TP information is indicated by, for example, RRC signaling from base station 100 to terminal 200. For example, base station 100 may include configuration information in a CQI-ReportConfig message and indicate it. Furthermore, base station 100 may configure whether CSI reporting is periodic CSI reporting or aperiodic CSI reporting for CSI report terminal 200 and include the configured information in the CQI-ReportConfig message and indicate it.

Furthermore, configuration section 101 configures two types of CSI reporting methods for CSI report terminal 200.

One of the reporting methods is a method of causing terminal 200 to report CSI of all transmission point candidates indicated in the TP candidate information. The other reporting method is a method of causing terminal 200 to report only CSI of transmission points indicated in the partial TP information.

For example, when periodic CSI reporting is configured for CSI report terminal 200, configuration section 101 causes terminal 200 to perform CSI reporting based on TP candidate information at a certain CSI reporting timing (CSI reporting of all transmission points) and causes terminal 200 to perform CSI reporting based on partial TP information at another CSI reporting timing (CSI reporting of some transmission points). Thus, base station 100 (reception processing section 108) receives a CSI report of all transmission points or a CSI report of some transmission points at each timing of periodic CSI reporting.

Alternatively, when aperiodic CSI reporting is configured for CSI report terminal 200, configuration section 101 causes terminal 200 to perform CSI reporting based on TP candidate information at a timing of trigger corresponding to CSI reporting of all TP candidates (CSI reporting of all transmission points) out of CSI reporting triggers. Furthermore, configuration section 101 causes terminal 200 to perform CSI reporting based on partial TP information (CSI reporting of some transmission points) at a timing of trigger corresponding to CSI reporting of some TPs out of triggers of CSI reporting. Thus, base station 100 (reception processing section 108) receives a CSI report corresponding to each timing out of CSI reports of all transmission points and CSI reports of some transmission points.

It should be noted that base station 100 (configuration section 101) may use CSI reporting of all transmission points included in TP candidate information to determine a combination of transmission points included in partial TP information. More specifically, base station 100 may determine several high order (a predetermined number of) transmission points with good CSI out of CSI reports of all transmission points included in the TP candidate information as a combination of transmission points included in the partial TP information. That is, the transmission points included in the partial TP information are a predetermined number of transmission points with good CSI out of a plurality of transmission points.

Furthermore, base station 100 (configuration section 101) may change the combination of transmission points included in the partial TP information (e.g., combination of transmission points which becomes '1' in the bit-map in FIG. 6). For example, suppose poor CSI is reported at a certain transmission point when CSI reporting based on partial TP information is received. In this case, base station 100 may delete the transmission point from the "partial TP information" and add other transmission points to the "partial TP information."

Alternatively, when it is assumed that the physical distance between a transmission point included in the partial TP information and terminal 200 is large, base station 100 may delete the transmission point from the "partial TP information" as described above. It should be noted that when the combination of transmission points included in the partial TP information is changed, base station 100 may indicate the change to terminal 200 using MAC CE at an optional timing.

On the other hand, in terminal 200, CSI generating section 206 identifies, based on the configuration information (TP candidate information, partial TP information) and trigger information, whether CSI reporting at each reporting timing is CSI reporting based on TP candidate information (CSI reporting of all transmission points) or CSI reporting based on partial TP information (CSI reporting of some transmission points). CSI generating section 206 measures CSI at each transmission point (all transmission points or some transmission points) in accordance with the identified CSI reporting and generate CSI.

For example, when periodic CSI reporting is configured, CSI generating section 206 identifies CSI reporting based on TP candidate information (CSI reporting of all transmission points) at a certain CSI reporting timing and generates CSI of all transmission points. On the other hand, CSI generating section 206 identifies CSI reporting based on partial TP information (CSI reporting of some transmission points) at another certain CSI reporting timing and generates CSI of some transmission points.

Moreover, when aperiodic CSI reporting is configured, CSI generating section 206 identifies CSI reporting based on TP candidate information (CSI reporting of all transmission points) at a timing of trigger corresponding to CSI reporting of all TP candidates among CSI reporting triggers and generates CSI of all transmission points. On the other hand, CSI generating section 206 identifies CSI reporting based on partial TP information (CSI reporting of some transmission points) at a timing of trigger corresponding to CSI reporting of some TPs and generates CSI of some transmission points.

Figure 8:
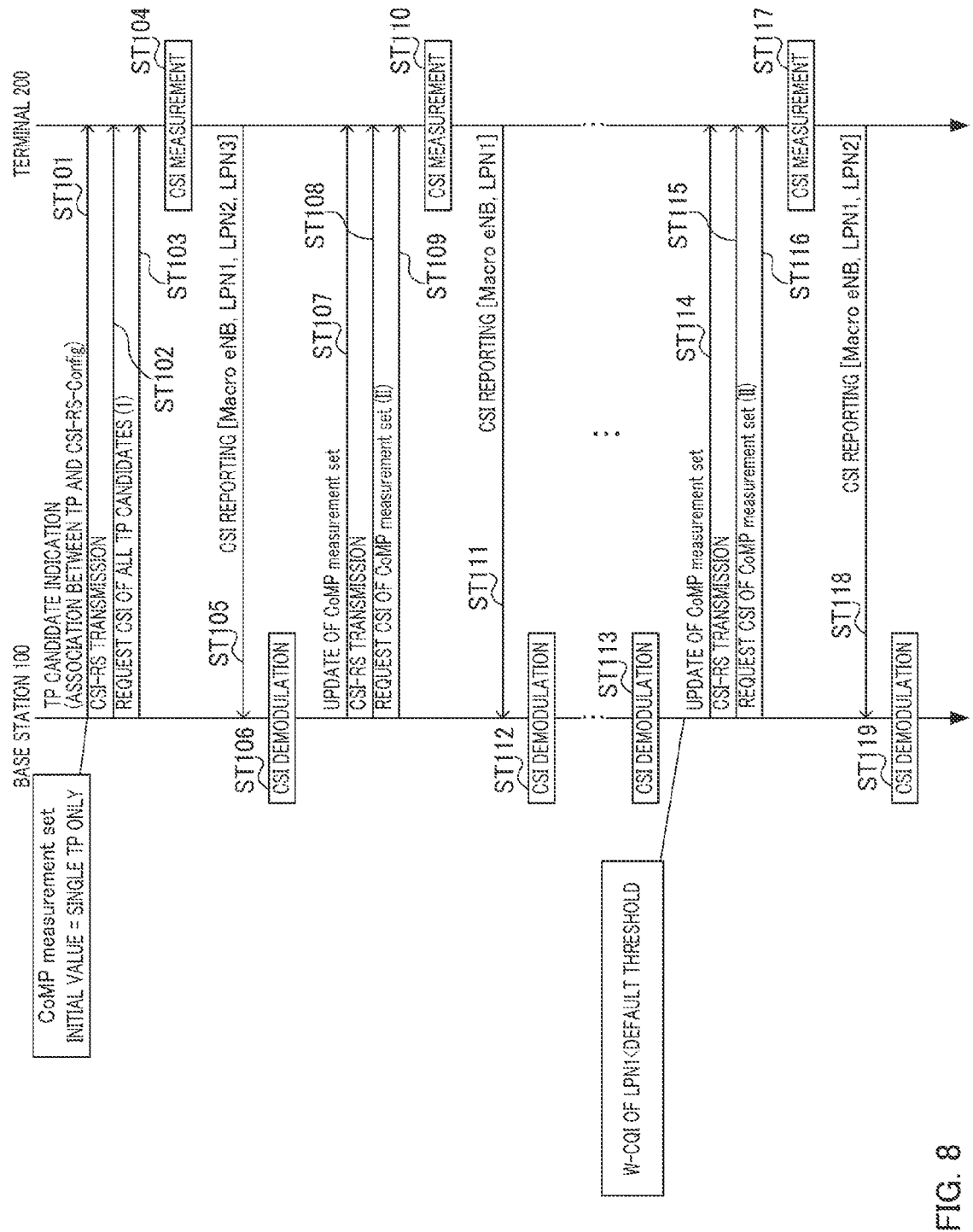
FIG. 8 is a diagram illustrating processing in the base station and the terminal according to Embodiment 1 of the present invention.

Next, a processing flow of base station 100 and terminal 200 will be described. FIG. 8 is a sequence diagram illustrating a processing flow of base station 100 and terminal 200. It should be noted here that transmission points (TP candidates) that can be connection destinations of terminal 200 in mobility control are assumed to be four transmission points: Macro eNB, LPN1, LPN2 and LPN3.

Furthermore, base station 100 configures a certain single transmission point as an initial value of CoMP measurement set. For example, the single transmission point configured as the initial value of CoMP measurement set is assumed to be a transmission point for performing processing in steps (hereinafter, referred to as "ST") 101 to ST105 (which will be described later) with terminal 200 (transmission point that transmits/receives downlink control signals intended for terminal 200, for example, LPN1). Base station 100 assumes TP index i corresponding to the single transmission point to be '1' as an initial value of "partial TP information" shown in FIG. 6 and assumes TP index i corresponding to other transmission points to be '0.' Partial TP information represented by such a bit-map is previously indicated from base station 100 to terminal 200 using MAC CE.

In FIG. 8, in ST101, base station 100 indicates TP candidate information to terminal 200. Here, base station 100 includes Macro eNB, LPN1, LPN2 and LPN3 as TP candidates. Furthermore, base station 100 associates each TP candidate with a CSI-RS configuration (CSI-RS configuration, CSI-RS-Config). The CSI-RS configuration includes the number of antenna ports, resource positions, period and offset, power ratio with respect to a data channel or the like. Thus, the TP candidate information is configured by arranging the respective CSI-RS configurations associated with TP candidates in order. This TP candidate information is indicated from base station 100 to terminal 200 using a radio resource control message (RRC signaling).

In ST102, base station 100 transmits the CSI-RS configured in base station 100 to base station 200.

In ST103, base station 100 requests terminal 200 for CSI reporting of all TP candidates (here expressed as CSI reporting request (I)). For example, base station 100 indicates the CSI reporting request (I) to terminal 200 using trigger information corresponding to aperiodic CSI reporting.

Upon receipt of the CSI reporting request (I) in ST103, terminal 200 performs in ST104, CSI measurement for all transmission point candidates (CSI of Macro eNB, LPN1, LPN2, LPN3) indicated in the TP candidate information received in ST101 using a plurality of CSI-RSs received from each transmission point including the CSI-RSs received in ST102. That is, terminal 200 generates CSI respectively corresponding to a plurality of CSI-RSs from a plurality of transmission points based on the TP candidate information.

In ST105, terminal 200 reports CSI measured in ST104 (CSI of Macro eNB, LPN1, LPN2, LPN3) to base station 100.

In ST106, base station 100 demodulates the CSI received in ST105. This CSI is used, for example, for mobility control.

For example, in ST106, CSI of Macro eNB and CSI of LPN1 among the respective demodulated CSIs of Macro eNB, LPN1, LPN2, LPN3 are good. In this case, base station 100 configures two transmission points of Macro eNB and LPN1 in CoMP measurement set. That is, base station 100 includes the two transmission points of Macro eNB and LPN1 in the partial TP information. For example, when the CSI-RS configuration is indicated in order of "CSI of Macro eNB, LPN1, LPN2, LPN3," the partial TP information is expressed by bit-map "1, 1, 0, 0, 0." That is, some transmission points (partial TP information) limited as CSI reporting targets are defined as CoMP measurement sets used for CoMP control (transmission point of control target of CoMP) here, and a CSI reporting request for these transmission points is expressed as operation of requesting CSI reporting of CoMP measurement set.

In ST107, base station 100 indicates the updated partial TP information (that is, update of CoMP measurement set) to terminal 200 using MAC CE. In this case, upon receipt of an ACK response to the physical channel to which MAC CE has been indicated, base station 100 determines that terminal 200 has appropriately updated the CoMP measurement set.

In ST108, the base station transmits CSI-RS configured in base station 100 to terminal 200 in the same way as in ST102.

In ST109, base station 100 requests terminal 200 for CSI reporting of CoMP measurement set. That is, base station 100 requests terminal 200 for CSI reporting of transmission points which are CSI reporting targets (indicated here as CSI reporting request (II)) in the partial TP information. For example, base station 100 indicates the CSI reporting request (II) to terminal 200 using trigger information corresponding to aperiodic CSI reporting.

Upon receipt of the CSI reporting request (II) in ST109, terminal 200 performs in ST110, CSI measurement on the transmission point candidates (Macro eNB, LPN1) indicated as the CSI reporting targets in the partial TP information received in ST108 using CSI-RSs from the respective transmission points including the CSI-RS received in ST108. That is, terminal 200 generates CSI for CSI-RSs from some transmission points based on the partial TP information.

In ST111, terminal 200 reports the CSI measured in ST110 (CSI of Macro eNB, LPN1) to base station 100.

In ST112, base station 100 demodulates the CSI received in ST111. This CSI is used for CoMP control, for example.

Hereinafter, base station 100 requests CSI reporting of CoMP measurement set (that is, CSI reporting request (II) based on partial TP information) with a frequency necessary for CoMP control. Moreover, base station 100 requests CSI reporting of all transmission points (that is, CSI reporting request (I) based on TP candidate information) with a less frequency than the CSI reporting request (II).

Here, as shown in FIG. 8, suppose that the value indicated by wideband CQI (W-CQI) out of the CSI of LPN1 demodulated in ST113 becomes smaller than a predetermined value (threshold) and base station 100 detects that the receiving quality of signals arriving at terminal 200 from LPN1 has degraded. In this case, base station 100 updates the CoMP measurement set (that is, partial TP information). For example, base station 100 may add LPN2 located in the vicinity of LPN1 to the CoMP measurement set (partial TP information). In this case, the partial TP information is expressed by bit-map "1, 1, 1, 0, 0." In ST114, base station 100 indicates this updated partial TP information (that is, update of the CoMP measurement set) to terminal 200 using MAC CE. In this case, upon receipt of an ACK response to the physical channel whereby MAC CE has been indicated, base station 100 determines that terminal 200 has updated the CoMP measurement set appropriately.

In ST115, base station 100 transmits CSI-RS configured in base station 100 to terminal 200 in the same way as in ST102. In ST116, base station 100 requests terminal 200 for CSI reporting of the CoMP measurement set (CSI reporting request (II) based on partial TP information). In ST117, terminal 200 performs CSI measurement for transmission point candidates indicated as CSI reporting targets in the partial TP information received in ST116 (Macro eNB, LPN1, LPN2) using CSI-RS from the respective transmission points including the CSI-RSs received in ST115. In ST118, terminal 200 reports the CSI measured in ST117 (CSI of Macro eNB, LPN1, LPN2) to base station 100. In ST119, base station 100 demodulates the CSI received in ST118.

Hereinafter, base station 100 and terminal 200 repeat the above-described processing.

It should be noted that in FIG. 8, aperiodic CSI reporting has been described as an example. That is, a case has been described where base station 100 switches between a CSI reporting request of all transmission points indicated in the TP candidate information and a CSI reporting request of transmission points (CoMP measurement set) indicated in the partial TP information using "trigger information" corresponding to aperiodic CSI reporting. However, without being limited to this, base station 100 may also switch between the two CSI reporting methods according to a triggered "subframe." More specifically, base station 100 may request CSI reporting of all transmission points indicated in the TP candidate information at triggers in even-numbered subframes and request CSI reporting of transmission points indicated in the partial TP information at triggers in odd-numbered subframes. Alternatively, base station 100 may also switch between the two CSI reporting methods using a bit-map corresponding to 40 consecutive subframes separately indicated using RRC signaling. Alternatively, without being limited to aperiodic CSI reporting using triggers, base station 100 may also switch between the two CSI reporting methods using periodic CSI reporting.

By this means, in base station 100, configuration section 101 configures a plurality of transmission points, and at least one of some transmission points of the plurality of transmission points, transmission processing section 104 transmits TP candidate information indicating a plurality of transmission points and partial TP information indicating some transmission points to terminal 200, and reception processing section 108 receives a first channel information part including CSI respectively corresponding to a plurality of CSI-RSs from a plurality of transmission points generated in terminal 200 based on TP candidate information, and second channel information part including CSI corresponding to CSI-RSs from some transmission points generated in terminal 200 based on partial TP information. Furthermore, in terminal 200, reception processing section 203 receives a plurality of CSI-RSs from a plurality of transmission points, TP candidate information indicating a plurality of transmission points, and partial TP information indicating at least one of some transmission points of the plurality of transmission points, CSI generating section 206 generates a first channel information part including CSI respectively corresponding to a plurality of CSI-RSs from a plurality of transmission points based on TP candidate information, and that generates second channel information part including CSI corresponding to CSI-RSs from the some transmission points based on partial TP information, and transmission signal forming section 208 transmits the generated first channel information and second channel information parts.

Furthermore, for example, base station 100 configures CoMP measurement set using CSI of all transmission points included in TP candidate information and indicates "partial TP information" indicating transmission points making up the CoMP measurement set to terminal 200. For example, base station 100 configures a predetermined number of transmission points having better CSI among all transmission points included in TP candidate information in the CoMP measurement set (some transmission points). Base station 100 then indicates to terminal 200, CSI reporting based on "partial TP information" with a frequency necessary for CoMP control. Thus, by limiting CSI reporting targets to only transmission points of CoMP control targets, it is possible to prevent the data amount of uplink signals necessary for CSI reporting from increasing and prevent transmission power necessary to transmit uplink signals in terminal 200 from increasing.

Furthermore, base station 100 indicates CSI reporting based on "TP information" (the above-described first channel information) to terminal 200 with a frequency lower than the frequency of CSI reporting based on "partial TP candidate information" (the above-described second channel information) and updates the CoMP measurement set (that is, partial TP information). It is thereby possible to prevent the data amount of uplink signals necessary for CSI reporting from increasing and secure a wide range of transmission point candidates which can be connection destinations of terminal 200.

As described above, according to the present embodiment, base station 100 uses a plurality of transmission points which become mobility control candidates for terminal 200 using control such as RRC signaling without changing them for a long time and causes terminal 200 to report only CSI of some of the plurality of transmission points (e.g., CoMP control targets). Thus, according to the present embodiment, compared to a case where CSI reporting of transmission point candidates that can be connection destinations of terminal 200 is always performed, it is possible to prevent an increase in transmission power necessary to transmit CSI in terminal 200 while securing a wide range of transmission point candidates that can be connection destinations of terminal 200 (mobility control candidates).

Moreover, base station 100 associates one CSI-RS configuration (CSI-RS-Config) with each transmission point that can be a mobility control candidate (TP candidate). That is, one CSI-RS is configured for each of the plurality of transmission points. That is, base station 100 configures TP candidate information using a CSI-RS configuration introduced in LTE-A. In other words, a CSI-RS configuration configured for one transmission point is associated with each bit (transmission point) making up partial TP information which is bit-map based information. Thus, according to the present embodiment, it is possible to dynamically indicate some transmission points which are limited as CoMP control targets while using the CSI-RS configuration introduced in LTE-A for mobility control, and thereby prevent an increase in required transmission power in terminal 200 accompanying the reporting of CSI (information having a great amount of information required for reporting).

It should be noted that in the present embodiment, a plurality of combinations of transmission points configured as TP candidate information may be configured. In this case, base station 100 may indicate to terminal 200, which combination should be used at different points (aperiodic CSI trigger points) of aperiodic trigger information (aperiodic CSI trigger). Alternatively, base station 100 may also instruct which combination should be used in accordance with transmission timing of a trigger.

It should be noted that the present embodiment may also be configured so as to use a plurality of component carriers. More specifically, a macrocell may be configured as component carrier A and a plurality of picocells may be configured as component carriers B. Moreover, the present embodiment may configure different subframe timings among cells. More specifically, it may be possible to adopt a timing configuration of adding an offset of α to a picocell with respect to a subframe timing configured in a macrocell, and adopt a configuration of transmitting a (t+α)-th subframe in a picocell at a time at which a t-th subframe is transmitted in a macrocell. The base station and the terminal interpret subframes corresponding to the aforementioned configuration information of CSI-RS using the subframe timings configured here.

[Embodiment 2]

In the present embodiment, configuration section 101 of base station 100 (FIG. 5) configures a CSI-RS configuration (CSI-RS-Config) for each base station (HPN and LPN) in the same way as in Embodiment 1. For example, configuration section 101 configures CSI-RS-Config_1 as the CSI-RS configuration for one of the two base stations shown in FIG. 9A and configures CSI-RS-Config_2 as the CSI-RS configuration for the other base station.

Furthermore, base station 100 indicates TP candidate information using RRC signaling. In this case, configuration section 101 associates CSI-RS configurations set for a plurality of base stations as one transmission point. That is, base station 100 handles the plurality of CSI-RS configurations respectively configured for the plurality of base station as a plurality of CSI-RS configurations configured for one transmission point. That is, in the present embodiment, a plurality of CSI-RSs is configured for one transmission point.

Figure 9:
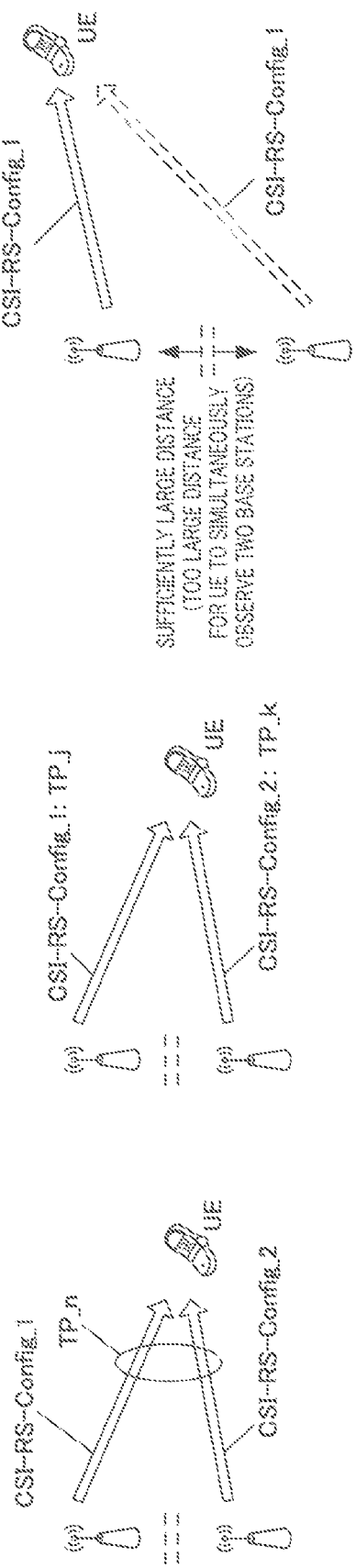
FIGS. 9A to 9C are diagrams illustrating association between transmission points and CSI-RS configuration according to Embodiment 2 of the present invention.

For example, in FIG. 9A, base station 100 associates CSI-RS-Config_1 and CSI-RS-Config_2 respectively configured for the two base stations with one transmission point TP_n. In other words, a plurality of CSI-RS configurations respectively configured for a plurality of base stations are associated with respective bits making up partial TP information which is bit-map based information (transmission point TP_i, that is, transmission point indicated by one bit in MAC CE).

Base station 100 then indicates "TP candidate information" indicating transmission point candidates including TP_n shown in FIG. 9A to terminal 200. Furthermore, base station 100 indicates "partial TP information" indicating whether each of the transmission point candidates including TP_n shown in FIG. 9A is one of some transmission points to terminal 200.

On the other hand, CSI generating section 206 of terminal 200 generates CSI based on the TP candidate information and partial TP information indicated from base station 100. For example, when transmission point T_n shown in FIG. 9A is instructed as a CSI reporting target, CSI generating section 206 assumes the two base stations shown in FIG. 9A as one transmission point T_n, performs CSI measurement and generates CSI. That is, CSI generating section 206 measures single RI, PMI and CQI for every one transmission point T_n indicated in TP candidate information (transmission point T_n unit indicated by MAC CE). Terminal 200 then reports CSI to base station 100 in transmission point T_n units.

It should be noted that when selecting an optimum PMI for transmission point T_n, CSI generating section 206 measures PMI using the same codebook for a plurality of CSI-RSs configured in transmission point T_n. For example, when the number of antenna ports configured for each base station shown in FIG. 9A is two, two sets of CSI-RSs are set for every two antenna ports in TP_n and TP_n is assumed as one transmission point having a total of four antenna ports. Therefore, CSI generating section 206 selects an optimum PMI for transmission point T_n using a codebook for four antenna ports.

In this way, base station 100 can receive CSI for a plurality of base stations as CSI of single transmission point T_n. For example, when the number of antenna ports configured for the two base station shown in FIG. 9A is two respectively, base station 100 receives CSI of transmission point TP_n which is assumed as one transmission point having a total of four antenna ports 1 to 4. Base station 100 receives CSI corresponding to antenna ports 1 and 2 of CSI of TP_n as CSI corresponding to CSI-RS-Config_1 and receives CSI reports corresponding to antenna ports 3 and 4 as CSI corresponding to CSI-RS-Config_2.

By this means, it is possible to reduce the number of bits required to indicate a combination of transmission points that can be connection destinations of terminal 200. That is, it is possible to reduce the number of bits required for indication when antenna ports are associated with aperiodic CSI triggers compared to a case where the number of sets of the actual CSI-RS configuration is indicated as is.

Furthermore, terminal 200 can report CSI for each transmission point with which a plurality of CSI-RS configurations are associated without being aware of which CSI-RS (CSI-RS port, that is, base station (HPN, LPN)) is geographically near. That is, terminal 200 can perform CSI reporting without recognizing the correspondence between the physical arrangement of base stations (HPN, LPN) and the CSI-RS configuration.

Moreover, terminal 200 measures and reports CSI corresponding to a plurality of CSI-RS configurations as a single transmission point, and can thereby prevent an increase in the data amount of uplink signals necessary for CSI reporting and prevent an increase in transmission power necessary to transmit uplink signals in terminal 200.

It should be noted that the present embodiment may also provide a plurality of MAC CEs and set a plurality of associations between CSI-RS configurations and transmission points. For example, the associations between CSI-RS configurations and transmission points may be switched in accordance with trigger points of aperiodic CSI reporting or trigger timings. For example, it may be possible to switch between CSI reporting corresponding to operation of performing coordinated beamforming (CB) transmission by a base station (CSI-RS port) located in a physically near position (see FIG. 9B) and CSI reporting corresponding to operation of performing joint (JT) transmission which bundles together a plurality of base stations into an equivalent large precoder (see FIG. 9A). This makes it possible to dynamically switch between combinations of CSI-RS ports regarding each transmission point to be indicated from base station 100 to terminal 200.

A case has been described in the present embodiment where a plurality of different CSI-RS configurations are associated with one transmission point. However, without being limited to this, the same CSI-RS configuration may also be associated with a plurality of transmission points. For example, as shown in FIG. 9C, when base stations are located at a sufficiently large distance and a terminal (UE) cannot simultaneously observe CSI-RSs from the respective base stations, the same CSI-RS configuration (CSI-RS-Config_1 in FIG. 9C) may be configured for each base station. This allows different base stations (transmission points) to reuse the same CSI-RS configuration, making it possible to reduce the number of CSI-RS configurations required in the entire system.

[Embodiment 3]

In the present embodiment, when reporting channel information on all transmission point candidates, terminal 200 (FIG. 7) reduces the amount of information of channel information corresponding to transmission point candidates other than a CoMP measurement set compared to the amount of information of channel information corresponding to transmission point candidates included in the CoMP measurement set.

More specifically, as in the case of Embodiment 1, CSI generating section 206 of terminal 200 receives an instruction of a periodic CSI reporting request or aperiodic CSI reporting request and generates channel information corresponding to transmission point candidates indicated in TP candidate information or partial TP information.

However, when reporting CSI of all transmission points indicated in TP candidate information, CSI generating section 206 generates CSI including CQI, PMI, RI or the like for transmission point candidates included in the CoMP measurement set (that is, transmission points included in partial TP information) among all transmission point candidates as in the case of Embodiment 1.

On the other hand, CSI generating section 206 generates channel information with the smaller amount of information than the channel information of transmission point candidates included in the CoMP measurement set for remaining transmission point candidates other than transmission point candidates included in the CoMP measurement set (transmission points included in partial TP information) among all transmission point candidates.

For example, CSI generating section 206 performs CSI measurement for transmission point candidates other than the CoMP measurement set as a single antenna (e.g., only the lowest numbered port among antenna ports indicated by CSI-RS-Config as in the case of port15) irrespective of the number of antenna ports configured for the transmission points and generates CSI including the measurement result.

Alternatively, when the CSI-RS configuration configured for transmission point candidates other than the CoMP measurement set is two or more antenna ports, CSI generating section 206 may generate CSI not including PMI or RI for the transmission points (e.g., CSI generated by using transmission diversity of two antenna ports (two low-numbered ports such as ports 15 and 16 of antenna ports indicated by CSI-RS-Config)).

Alternatively, CSI generating section 206 may reduce the granularity of control relative to that in CSI reporting of transmission point candidates included in the CoMP measurement set and generate a CSI report of transmission point candidates other than the CoMP measurement set. For example, CSI generating section 206 measures narrow band CQI (subband CQI) for the transmission point candidates included in the CoMP measurement set and measures wideband CQI (wideband CQI) for the transmission point candidates other than the CoMP measurement set. This allows base station 100 (FIG. 5) to perform resource control in subband units when performing CoMP control on transmission points included in the CoMP measurement set. On the other hand, the amount of information of CSI reporting of transmission points other than the CoMP measurement set, that is, transmission points to be subjected to mobility control is reduced.

That is, the amount of information of CSI (CSI included in the first channel information) respectively corresponding to a plurality of CSI-RSs from a plurality of transmission points based on TP candidate information in terminal 200 is smaller than the amount of information of CSI corresponding to CSI-RSs from some transmission points (CSI included in the second channel information) based on partial TP information in terminal 200.

Thus, in the present embodiment, terminal 200 changes contents of CSI reporting between transmission points included in the CoMP measurement set and transmission points other than the CoMP measurement set. More specifically, base station 100 requires CQI/PMI/RI or the like of each transmission point (e.g., information on the narrow band) for CoMP control. In contrast, it is sufficient for base station 100 to be able to identify signal intensity at each transmission point (e.g., information on the wideband) for mobility control. Thus, terminal 200 generates CSI with a relatively smaller amount of information than CSI reporting of transmission points included in the CoMP measurement set for transmission points other than the CoMP measurement set. Thus, base station 100 receives channel information necessary for CoMP control regarding transmission points included in the CoMP measurement set among transmission point candidates. On the other hand, base station 100 receives only minimum necessary channel information for mobility control regarding transmission points other than the CoMP measurement set among transmission point candidates.

Thus, by narrowing down contents of CSI reporting for transmission points other than the CoMP measurement set (that is, transmission points not used for CoMP control) to minimum necessary information for mobility control, it is possible to reduce an increase in the data amount of uplink signals necessary for CSI reporting compared to Embodiment 1 and reduce an increase in transmission power necessary for terminal 200 to transmit uplink signals.

It should be noted that in the present embodiment, base station 100 may set power of CSI so as to reduce a power ratio of CSI to data channels for transmission points included in the CoMP measurement set (so that the power ratio falls within a minus range) and set power of CSI so as to increase the power ratio of CSI to data channels for transmission points other than the CoMP measurement set (so that the power ratio falls within a plus range). Even when quality is good, this allows transmission points to be subjected to CoMP control to report CSI without exceeding an upper limit within which a CQI table can express the quality. On the other hand, even when the quality falls below the minimum necessary communication quality for CSI measurement, the transmission points to be subjected to mobility control can express the level of receiving power and can increase flexibility of mobility control.

Furthermore, the present embodiment may also configure a plurality of associations between each transmission point and MAC CE and change parameters relating to CSI reporting from one configuration to another. Examples of parameters relating to CSI reporting include cqi-ReportMode relating to CSI reporting and reporting period of periodic CSI or the like. For example, as a first pattern of the configuration, narrow band PMI and narrow band CQI may be associated with transmission points included in the CoMP measurement set and wideband CQI without PMI may be associated with transmission points other than the CoMP measurement set. As a second pattern of the configuration, wideband PMI and wideband CQI may be associated with transmission points included in the CoMP measurement set and RSRP (Reference Signal Reception Power) may be associated with transmission points other than the CoMP measurement set. It is possible to realize an operation of associating these configurations with trigger points of aperiodic CSI reporting or timings of triggers and using the configurations by switching between the configurations in accordance with an instruction from base station 100. By this means, it is possible to control the load of measurement and reporting of channel information in CSI report 200 or control CSI reporting in accordance with an uplink traffic situation.

[Embodiment 4]

In the present embodiment, when indicating TP candidate information, base station 100 (FIG. 5) configures CSI reporting corresponding to CRS for specific transmission points.

Here, CSI-RS is a reference signal added in LTE-A and is used for channel estimation or the like. On the other hand, CRS is a reference signal also used in LTE and is used for mobility control or the like. Moreover, CRS is used to demodulate signals of a downlink control channel (PDCCH or the like). On the other hand, CSI-RS is not used to demodulate signals of a downlink control channel (PDCCH or the like).

When terminal 200 (FIG. 7) receives an instruction of a CSI reporting request, and performs CSI reporting for all transmission point candidates or CSI reporting for some transmission point candidates (transmission points of the CoMP measurement set), if CSI reporting of transmission points corresponding to CRS is instructed, terminal 200 performs CSI measurement using CRS for the transmission points and reports the measured CSI to base station 100.

Base station 100 demodulates a downlink control channel (PDCCH) or the like using CSI corresponding to a CRS reported from terminal 200.

Thus, according to the present embodiment, reference signals used to generate CSI in terminal 200 include not only CSI-RSs but also CRSs to demodulate at least a downlink control channel (PDCCH). By so doing, base station 100 can use not only CSI using CSI-RSs but also CSI using CRSs, and can thereby use CSI for link adaptation or the like for a channel that performs demodulation using CRSs such as a downlink control channel (PDCCH). Specific examples of link adaptation for a downlink control channel include determination of a CCE aggregation level when control channel elements (CCEs) which are downlink control channel resources are aggregated and used, and power configuration of transmission power control or the like.

It should be noted that in the present embodiment, CSI reporting using CRS may be associated with a specific transmission point (TP index). This makes it possible to handle the presence or absence of reports of CSI measurement results using CRS in the same way as addition/deletion of transmission points within the CoMP measurement set (partial TP information). Thus, CSI measurement results using CRS can be reported only with a frequency required in base station 100.

Furthermore, the presence or absence of CSI reporting using CRS in the present embodiment may be associated with aperiodic CSI trigger. This makes it possible to dynamically switch between CSI reporting instructions using CRS using aperiodic CSI trigger. In this way, CSI measurement results using CRS can be reported only with a frequency required in base station 100.

In the present embodiment, a configuration may also be adopted in which CSI reporting using CRS is included in periodic CSI reporting of specific transmission points and not included in aperiodic CSI reporting. This allows CSI using CRS to be reported only with a previously configured frequency.

Furthermore, in the present embodiment, a specific one bit (specific TP index) among bits indicated by MAC CE (TP index) may be associated with the presence or absence of reporting of only PMI of each transmission point in the CoMP measurement set and the presence or absence of indication of information on each transmission point other than the CoMP measurement set measured using CRS (that is, interference component). This allows minimum necessary channel information for CoMP control to be reported only with a frequency required in base station 100. It should be noted that an example has been shown here where information (interference component) on each transmission point other than the CoMP measurement set is measured using CRS, but without being limited to this, an operation of measuring the information using CSI-RS may also be adopted.

Moreover, in the present embodiment, a specific one bit (specific TP index) among bits (TP index) to be indicated by MAC CE may be associated with the presence or absence of indication whereby explicit feedback such as covariance matrix measured using CRS is reported. This allows large size information relating to CoMP control to be reported only with a frequency required in base station 100. It should be noted that an example of measuring explicit feedback using CRS has been shown here, but without being limited to this, an operation of measuring explicit feedback using CSI-RS may also be adopted.

[Embodiment 5]

In the present embodiment, serving TP is indicated by MAC CE for indicating partial TP information.

Here, serving TP is a transmission point that subjectively sends/receives control signals or the like to/from terminal 200. That is, serving TP is a transmission point which becomes a sender of a downlink control signal (PDCCH) intended for terminal 200.

More specifically, when indicating information relating to transmission point candidates (TP candidate information and partial TP information) to terminal 200, base station 100 explicitly indicates which transmission point corresponds to the serving TP of CSI report terminal 200 to terminal 200 using a predetermined number of bits of MAC CE.

For example, FIG. 10 illustrates a configuration of MAC CE. The MAC CE shown in FIG. 10 is composed of 16 bits.

In FIG. 10, 12 bits out of 16 bits respectively indicate whether or not transmission point candidates $T_1$ to $T_{12}$ which can be connection destinations of terminal 200 are some transmission points (CoMP measurement set).

On the other hand, in FIG. 10, the remaining 4 bits other than the 12 bits indicating transmission point candidates among 16 bits indicate serving TP (serving $TP_i$) of terminal 200. For example, one of transmission point candidates $T_1$ to $T_{12}$ shown in FIG. 10 is set as serving $TP_i$ shown in FIG. 10.

Terminal 200 (reception processing section 203) receives serving $TP_i$ indicating a transmission point which is a sender of downlink control signals intended for terminal 200 using the region (remaining 4 bits) other than the region (12 bits) to which partial TP information is assigned out of 16 bits in MAC CE (indication region) having a predetermined size (corresponding to 16 bits). Upon receipt of the MAC CE, terminal 200 checks a resource to which serving TP in the MAC CE is assigned and identifies a serving TP (transmission point that sends/receives control signals) of terminal 200.

The MAC CE can indicate information at an optional timing and can indicate information with less delay than RRC control (RRC signaling). Thus, according to the present embodiment, it is possible to dynamically switch between serving TPs of terminal 200 through indication of serving TP using a MAC CE without delays.

It should be noted that in the present embodiment, when serving TP is indicated, one of transmission points having an identical cell ID may be indicated as the serving TP among transmission point candidates (transmission points which can be connection destinations of terminal 200) corresponding to the CSI-RS configuration indicated as TP candidates. Thus, by limiting transmission points that can be serving TPs, it is possible to reduce the number of bits required to indicate serving TPs and reduce overhead of control information. That is, in this case, the number of bits required to indicate the serving TPs is not the number of bits that can express all TP candidates, but can only be the number of bits that can express transmission points having an identical cell ID.

Moreover, the present embodiment may also be applied to a system for which a plurality of resource candidates are configured when a downlink control channel (e.g., PDCCH) is detected and which identifies resources assigned information intended for terminal 200 by the terminal 200 side performing blind detection. More specifically, target resources to be blind-detected by terminal 200 (resource region assigned information intended for terminal 200) may be indicated using part of MAC CE. In this way, compared to indication through RRC control (RRC signaling), it is possible to dynamically switch between resources of a downlink control channel without delays. This is equivalent to dynamically switching transmission points themselves that transmit control channels. Furthermore, for example, an indication region of part of MAC CE may be used to indicate a blind-detection (blind decoding) region of E-PDCCH through which a downlink control channel is arranged in the data region.

In the present embodiment, a resource region of a CSI reporting uplink control channel (e.g., PUCCH) may be indicated using part of MAC CE. Compared to indication through RRC control (RRC signaling), this allows transmission points that receive an uplink control channel to be dynamically switched without delays. Examples of the indication regarding a resource region of an uplink control channel (PUCCH) for CSI reporting more specifically include an RB number used, the number of cyclic shifts, number of a Walsh sequence or the like.

In the present embodiment, a scrambling code applicable to downlink data signals (PDSCH) may be indicated using part of MAC CE. Compared to indication through RRC control (RRC signaling), this allows scrambling codes of downlink data signals to be dynamically switched without delays. This is equivalent to dynamically switching transmission points that transmit downlink data signals used for CoMP and multiuser MIMO.

[Embodiment 6]

The above embodiment has described the operation of downlink channel information reporting when mobility control in the physical layer and CoMP control are simply combined. In contrast, the present embodiment will describe an operation relating to uplink signal transmission power control when mobility control in the physical layer and CoMP control are simply combined.

When performing uplink signal transmission power control, a terminal calculates path loss (amount of propagation attenuation between a base station (transmission point) and a terminal). For example, when calculating path loss, the terminal measures RSRP (reference signal reception power) for a previously indicated transmission point and estimates path loss PL_c between a transmission point and a terminal according to the following equation.

$$PL\_c = \text{referenceSignalPower} - \text{higher layer filtered RSRP} \ldots \quad \text{(Equation 1)}$$

In equation 1, referenceSignalPower indicates transmission power of a signal (e.g., CSI-RS or CRS) transmitted by a transmission point and is indicated from base station separately, and higher layer filtered RSRP indicates aforementioned RSRP (e.g., a long time average value). One example of a method of previously indicating a transmission point which becomes the aforementioned RSRP measurement target is a method using a radio resource control message (RRC signaling).

Using path loss PL_c calculated according to equation 1, transmission power $P_{SRS,c}(i)$ of reference signal (SRS: Sounding Reference Signal) for channel quality measurement in an i-th subframe, transmission power $P_{PUCCH}(i)$ of uplink control channel (PUCCH: Physical Uplink Control CHannel) and transmission power $P_{PUSCH,c}(i)$ of uplink data signal (PUSCH: Physical Uplink Shared CHannel) are configured according to following equations 2, 3 and 4 respectively.

(Equation 2)

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\} \quad [2]$$

(Equation 3)

$$P_{PUCCH}(i) = \min\begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases} \quad [3]$$

-continued (Equation 4)

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}$$ [4]

In Equations 2 to 4, $P_{CMAX,c}$ [dBm] indicates the maximum transmission power of a terminal, $P_{SRS\_OFFSET,c}$ [dBm] indicates an offset value (parameter set from the base station) for the transmission power of PUSCH transmitted by the terminal, $M_{SRS,c}$ indicates the number of frequency resource blocks assigned to the SRS, $P_{O\_PUSCH,c}$ [dBm] indicates an initial value (parameter set from the base station) of the transmission power of PUSCH, $\alpha_c$ indicates a weighting factor (parameter set from the base station) indicating the compensation ratio of the path loss (PL), and $f_c(i)$ indicates a cumulative total value in the i-th subframe including past values of transmission power control (TPC) command (control value; for example, +3 dB, +1 dB, 0 dB, and −1 dB) subjected to closed loop control. In addition, $P_{O\_PUCCH}$ [dBm] indicates an initial value (parameter set from the base station) of the transmission power of PUCCH, $h(n_{CQI}, n_{HARQ}, n_{SR})$ and $\Delta_{F\_PUCCH}(F)$ indicate parameters set according to the format type of PUCCH, the number of bits, and the like, and $\Delta_{TxD}(F')$ indicates the offset amount to be given when transmission diversity is applied to PUCCH. In addition, g(i) indicates a cumulative total value in the i-th subframe including the past values of TPC command subjected to closed loop control similar to $f_c(i)$. Furthermore, $M_{PUSCH,c}(i)$ indicates the number of frequency resource blocks of PUSCH assigned in the i-th subframe, $P_{O\_PUSCH,c}(j)$[dBm] indicates an initial value of transmission power of PUSCH, which is a parameter individually set from the base station in accordance with the type of quasi-fixed assignment (j=0) and dynamic assignment (j=1). Moreover, $\Delta_{TF,c}(i)$ indicates an offset value that can be set according to the amount of control information when control information is transmitted using PUSCH.

Thus, the transmission power set value is set with reference (e.g., path loss measurement target) to the previously indicated transmission point (that is, fixed transmission point). However, in the aforementioned heterogeneous network, a transmission point whose path loss becomes a minimum may be different from the previously indicated transmission point by the movement of the terminal. In this case, since the transmission power is also set with reference to the previously indicated transmission points, the set value of transmission power is also greater than an optimum transmission power set value (when a transmission point at which the path loss becomes a minimum is used as a reference). For this reason, there is a problem of providing great interference to a transmission point at which the path loss becomes a minimum and suppressing the capacity.

In order to solve this problem, it is also possible to switch between transmission points whose path loss is to be calculated (e.g., RSRP measurement target) by indicating individual radio resource control information items (RRC signaling). However, it generally takes a long time to update radio resource control information, which causes a control delay to increase, and can be detrimental to the aforementioned advantage of applying mobility control in the physical layer.

Moreover, in the operation of applying CoMP control to the uplink, that is, the operation of receiving uplink signals by a plurality of transmission points (which may also be referred to as "reception points (RP)") cooperating together, if the transmission power is configured by fixing the previously indicated transmission points, the improvement of receiving quality obtained through coordinated reception cannot be reflected in transmission power control and necessary transmission power increases.

Thus, in the present embodiment, when controlling transmission power of uplink signals, the terminal configures transmission power with reference to some transmission points among all transmission point candidates that can receive uplink signals of the terminal (e.g., transmission points to be subjected to coordinated reception control of a plurality of transmission points) as in the case of Embodiment 1.

Hereinafter, the present embodiment will be described more specifically.

[Configuration of Base Station 300]

Figure 11:
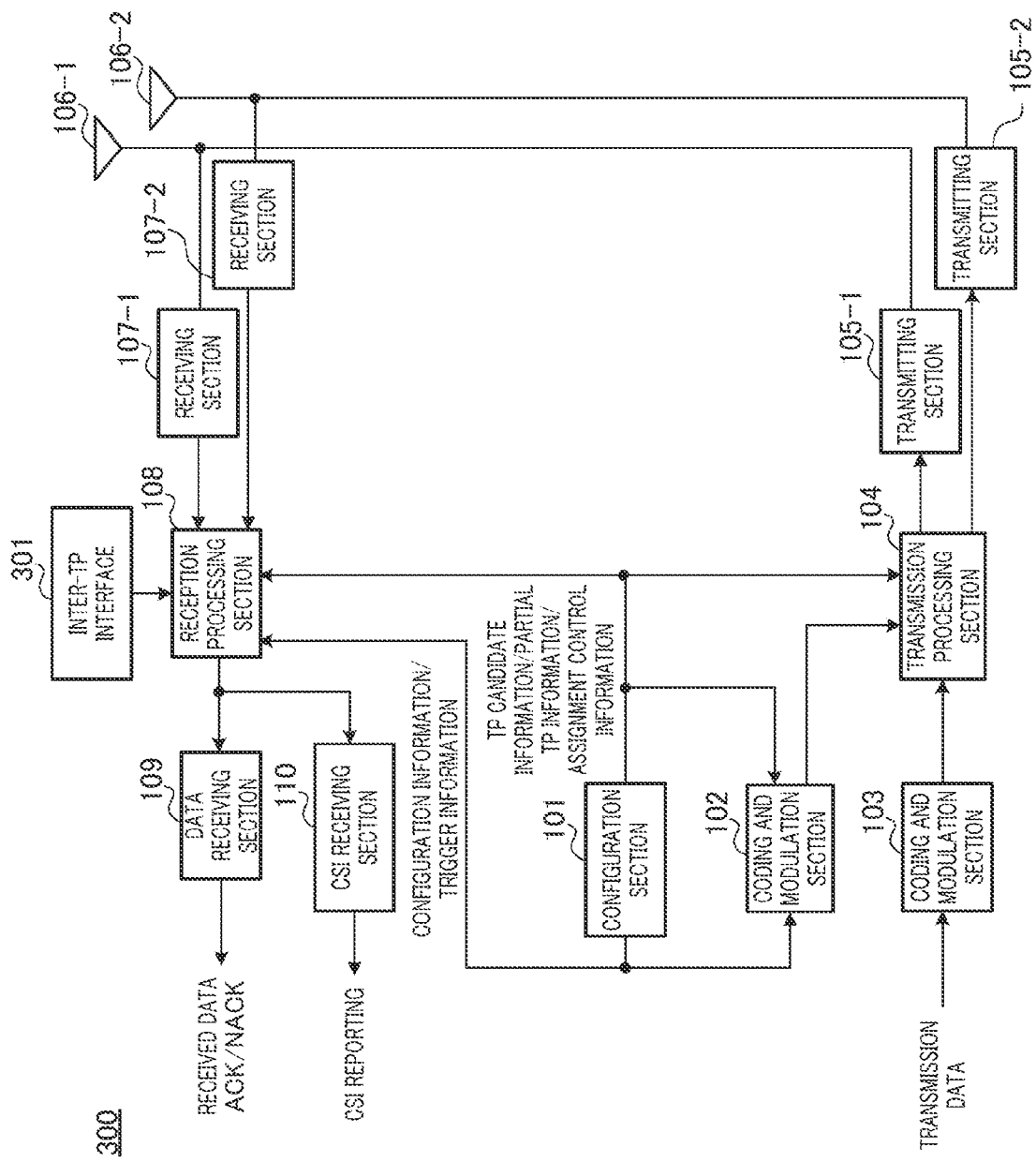
FIG. 11 is a block diagram illustrating a configuration of a base station according to Embodiment 6 of the present invention.

FIG. 11 is a block diagram illustrating a configuration of base station 300 according to the present embodiment. It should be noted that in FIG. 11, the same components as those in Embodiment 1 (FIG. 5) are assigned the same reference numerals and description thereof will be omitted.

In addition to the operation in Embodiment 1 (operation on the downlink), configuration section 101 performs the following operation (operation on the uplink). More specifically, configuration section 101 generates "TP candidate information" indicating all transmission point candidates (TP candidates or may also be referred to as reception point candidates (RP candidates)) that can receive uplink signals of terminal 400 (which will be described later) for terminal 400.

Furthermore, configuration section 101 generates "partial TP information" indicating at least one of some transmission points among a plurality of transmission point candidates included in TP candidate information for terminal 400. For example, configuration section 101 configures transmission points (CoMP reception points) to be subjected to CoMP control (coordinated reception by a plurality of transmission points) among a plurality of transmission point candidates as transmission points included in the partial TP information.

Furthermore, configuration section 101 configures whether or not to apply CoMP control (coordinated reception by a plurality of transmission points) to uplink signals (SRS, PUCCH and PUSCH).

As described above, TP candidate information, partial TP information and information indicating whether or not to apply CoMP control (coordinated reception by a plurality of transmission points) generated by configuration section 101 are respectively subjected to transmission processing in coding and modulation section 102, transmission processing section 104, and transmitting section 105 as configuration information and transmitted to terminal 400.

Configuration section 101 transmits TP candidate information, partial TP information and information indicating whether or not to apply CoMP control (coordinated reception by a plurality of transmission points) to terminal 400 via coding and modulation section 102 and outputs the information to reception processing section 108.

Inter-TP interface 301 is an interface that connects among a plurality of transmission points including base station 300.

Reception processing section 108 identifies, among the signals received from other transmission points via inter-TP interface 301 (received signals), resources to which the respective uplink signals of SRS, PUCCH and PUSCH are mapped based on configuration information including TP candidate information and partial TP information and trigger information received from configuration section 101, in addition to the operation of Embodiment 1. Reception processing section 108 then extracts the signal components mapped to the identified resources from the received signals.

Furthermore, when the configuration information received from configuration section 101 indicates the application of CoMP control (coordinated reception by a plurality of transmission points), reception processing section 108 performs signal combining processing. More specifically, reception processing section 108 combines signals from terminal 400 to which CoMP control is applied (signals corresponding to coordinated reception by a plurality of transmission points) between some transmission points indicated in the partial TP information and outputs the combined signal (uplink data signal and ACK/NACK information) to data receiving section 109 and outputs the combined CSI to CSI receiving section 110.

Moreover, when the configuration information received from configuration section 101 indicates the application of CoMP control (coordinated reception by a plurality of transmission points), reception processing section 108 measures an SINR using the received SRS and outputs the measurement result to the uplink parameter configuration section (not shown). The uplink parameter configuration section generates a transmission power control command and determines a modulation and coding scheme or the like based on the measurement result and indicates the command and the modulation and coding scheme to coding and modulation section 103 and transmission processing section 104.

[Configuration of Terminal 400]

Figure 12:
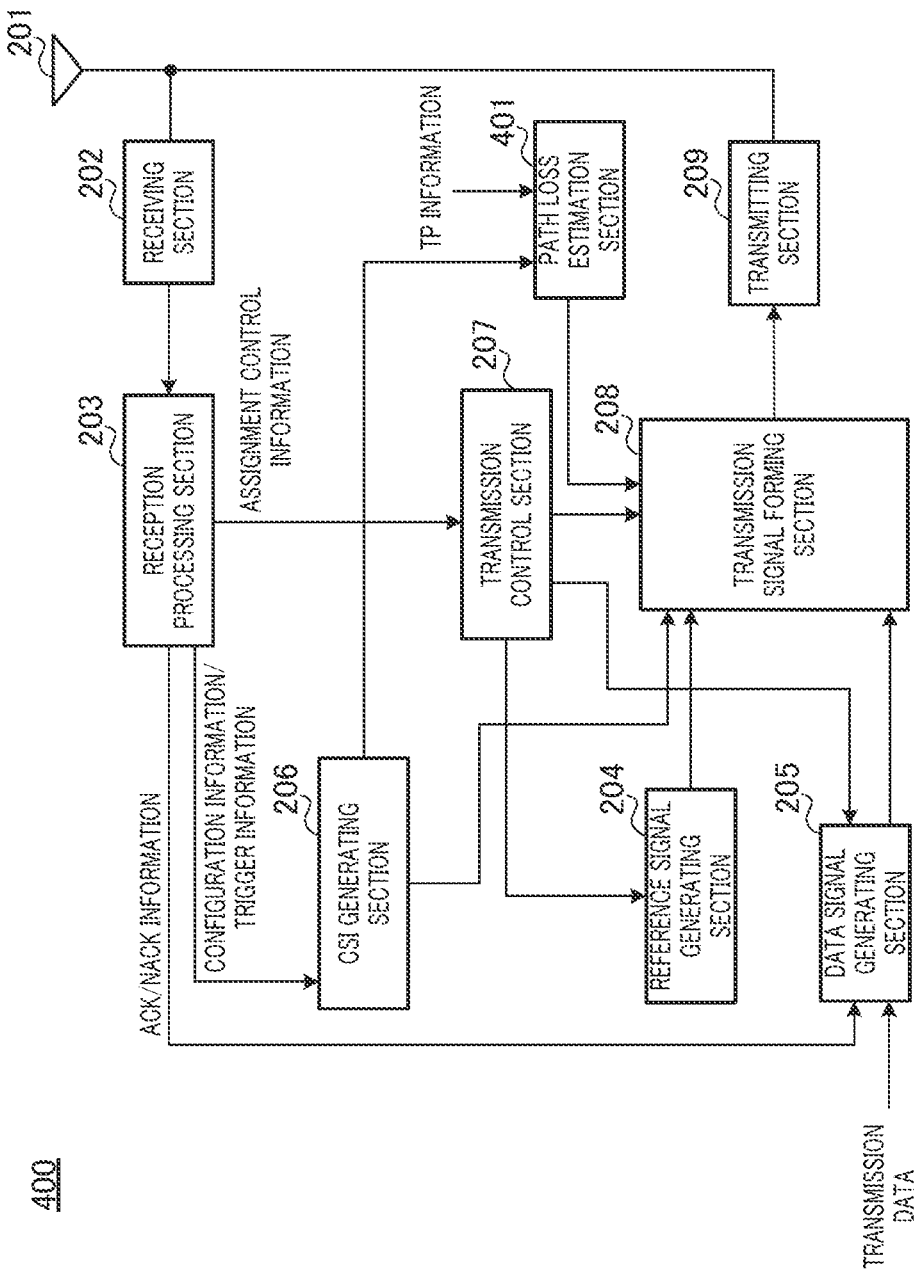
FIG. 12 is a block diagram illustrating a configuration of a terminal according to Embodiment 6 of the present invention.

FIG. 12 is a block diagram illustrating a configuration of terminal 400 according to the present embodiment. It should be noted that in FIG. 12, the same components as those in Embodiment 1 (FIG. 7) are assigned the same reference numerals and description thereof will be omitted.

When transmitting uplink signals, terminal 400 shown in FIG. 12 generates channel information (RSRP) of all transmission point candidates that can receive the uplink signals. Terminal 400 sets channel information (RSRP) corresponding to some transmission points (some TPs) among all the transmission point candidates described above as a reference to calculate path loss used for transmission power control of uplink signals.

CSI generating section 206 shown in FIG. 12 performs the following operations in addition to the operation of Embodiment 1. More specifically, CSI generating section 206 receives "TP candidate information" indicating a plurality of transmission points that can be connection destination candidates in the uplink of terminal 400. CSI generating section 206 generates RSRP corresponding to each TP candidate indicated in the TP candidate information. CSI generating section 206 outputs the generated RSRP of each TP candidate to path loss estimation section 401.

Path loss estimation section 401 receives "partial TP information" indicating at least one of some transmission points among a plurality of TP candidates indicated in the TP candidate information. Path loss estimation section 401 performs long-time averaging on the RSRP of each TP candidate received from CSI generating section 206. Next, path loss estimation section 401 estimates path loss PL_TPi between TP corresponding to TP index i and terminal 400 using RSRP corresponding to some transmission points indicated in the partial TP information of the averaged RSRP according to the following equation.

$$PL\_TPi = \text{referenceSignalPower} - \text{higher layer filtered RSRP} \ldots \quad \text{(Equation 5)}$$

In equation 5, referenceSignalPower indicates transmission power of CSI-RS or CRS separately indicated from the base station and higher layer filtered RSRP indicates the above-described averaged RSRP. It should be noted that averaging of RSRP is used to exclude influences of instantaneous fluctuation. As an example, while a value such as 5 ms is used as a CSI reporting period in which instantaneous fluctuation is actively used, a value of ten to several tens of times the CSI reporting period may be configured as an RSRP averaging period.

Path loss estimation section 401 applies transmission power control taking into account an operation of combining and receiving signals at transmission points indicated in partial TP information using the path loss corresponding to each transmission point estimated in this way (coordinated reception by a plurality of transmission points). As an example, path loss estimation section 401 calculates an average value of path loss corresponding to each transmission point indicated in partial TP information. For example, path loss estimation section 401 calculates path loss PL_c with reference to transmission points indicated in the partial TP information according to the following equation.

$$PL\_c = \text{average}(PL\_TPi1, PL\_TPi2, \ldots, PL\_TPin) \ldots \quad \text{(Equation 6)}$$

In equation 6, function average ( ) indicates a function that calculates an average value of values in parentheses and PL_TPi1 to PL_TPin respectively indicate path losses of transmission points corresponding to TP index i1 to TP index in. Path loss estimation section 401 outputs the calculated path loss (PL_c) to transmission signal forming section 208.

Transmission signal forming section 208 configures transmission power of uplink signals based on path loss inputted from path loss estimation section 401 in addition to the operation of Embodiment 1. More specifically, transmission signal forming section 208 configures transmission power of respective uplink signals (SRS, PUCCH and PUSCH) in an i-th subframe using the path loss PL_c calculated in equation 6 according to equations 2 to 4 respectively. This allows each uplink signal to be transmitted with the transmission power configured based on the path loss inputted from path loss estimation section 401 via transmitting section 209.

[Operations of Base Station 300 and Terminal 400]

Next, a processing flow of base station 300 and terminal 400 will be described.

Figure 13:
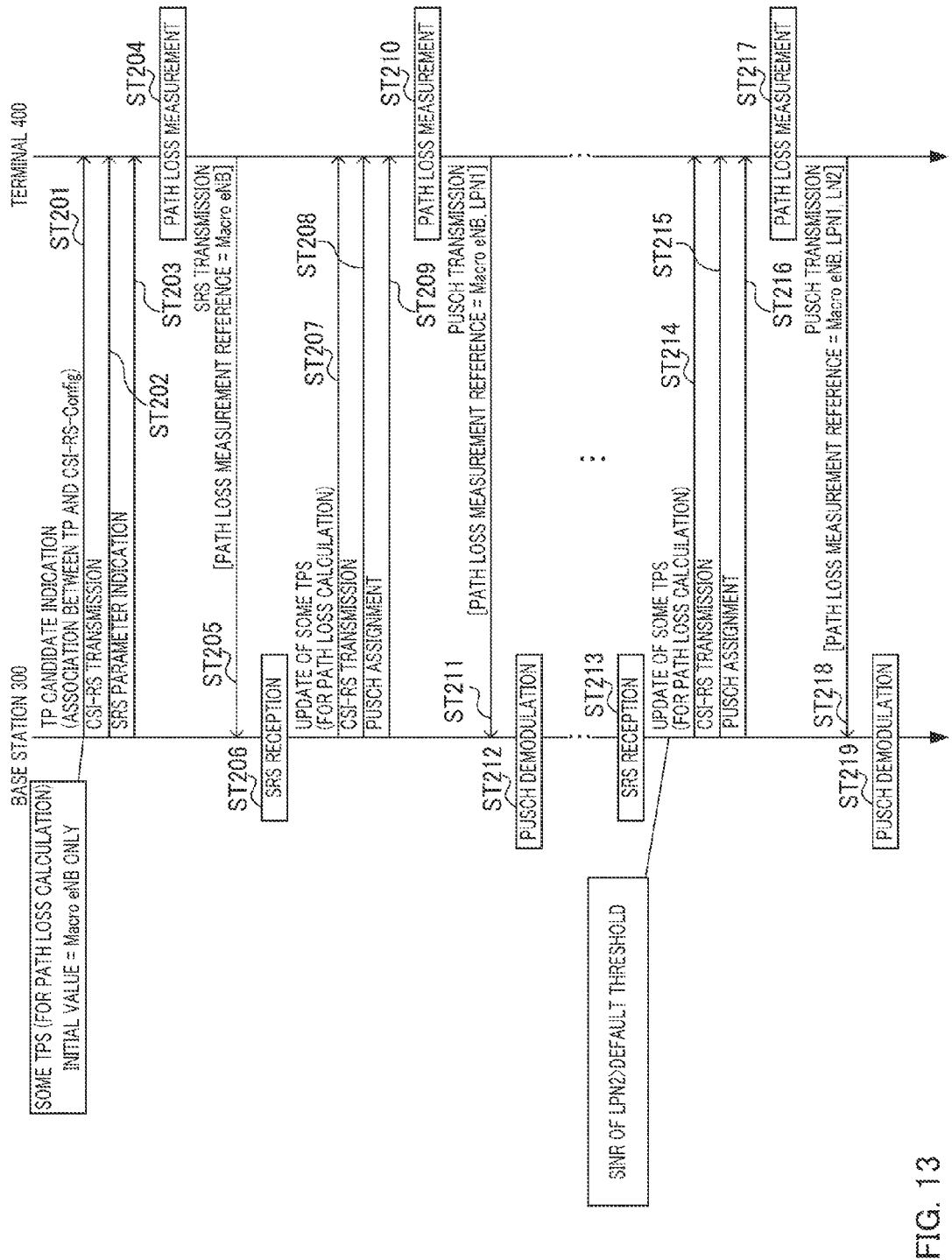
FIG. 13 is a diagram illustrating processing in the base station and the terminal according to Embodiment 6 of the present invention.

FIG. 13 illustrates a sequence diagram showing a processing flow of base station 300 and terminal 400. It should be noted that transmission points (TP candidates) which can be connection destinations of terminal 400 in the uplink in mobility control are assumed to be four transmission points of Macro eNB, LPN1, LPN2 and LPN3.

Furthermore, base station 300 configures a certain single transmission point as an initial value of a transmission point (path loss calculation TP) whose path loss is to be calculated. For example, a single transmission point configured as an initial value of a TP for path loss calculation is assumed to be a transmission point (transmission point at which downlink control signals intended for terminal 400 are sent/received, e.g., Macro eNB) that performs processing (which will be described later) in steps (hereinafter, referred to as "ST") 201 to ST205 between base station 300 and terminal 400. Base station 300 assumes TP index i corresponding to the single transmission point to be '1' as the initial value of "partial TP information" shown in FIG. 6 and assumes TP index i corresponding to other transmission points to be '0.' The partial TP information expressed by such a bit-map is previously indicated from base station 300 to terminal 400 by MAC CE.

In FIG. 13, in ST201, base station 300 indicates TP candidate information to terminal 400. Here, base station 300 includes Macro eNB, LPN1, LPN2 and LPN3 as TP candidates. Furthermore, base station 300 associates each TP candidate with a CSI-RS configuration (CSI-RS configuration, CSI-RS-Config). The CSI-RS configuration includes the number of antenna ports, resource positions, period and offset, its power ratio with respect to the data channel, or the like. Thus, the TP candidate information is configured by arranging the respective CSI-RS configurations associated with TP candidates in order. This TP candidate information is indicated from base station 300 to terminal 400 using a radio resource control message (RRC signaling).

In ST202, base station 300 transmits the CSI-RS configured for base station 300 to terminal 400.

In ST203, base station 300 indicates SRS configuration information (SRS parameter) to terminal 400. The SRS configuration information includes a cyclic shift sequence used for SRS, frequency position, bandwidth, transmission period, Comb number or the like. This SRS configuration information is indicated from base station 300 to terminal 400 using a radio resource control message (RRC signaling).

In ST204, upon receipt of SRS configuration information in ST203, terminal 400 performs RSRP measurement on all transmission point candidates (CSI of Macro eNB, LPN1, LPN2, LPN3) indicated in the TP candidate information received in ST201 using a plurality of CSI-RSs received from each transmission point including the CSI-RS received in ST202. That is, terminal 400 measures RSRPs respectively corresponding to the plurality of CSI-RSs from a plurality of transmission points based on the TP candidate information. Moreover, terminal 400 estimates path losses corresponding to transmission points (Macro eNB at the current point in time) indicated in the partial TP information according to equation 5 using the measured RSRPs. Furthermore, terminal 400 calculates a path loss (average value) with reference to a transmission point indicated in the partial TP information according to equation 6. In other words, terminal 400 assumes the RSRP measured value corresponding to a transmission point (Macro eNB) indicated in the partial TP information among the RSRPs measured in ST204 to be a reference for path loss measurement.

In ST205, terminal 400 configures SRS transmission power (e.g., equation 2) using the parameter indicated in the SRS configuration information in ST203 and using the path loss measured in ST204 (path loss measured assuming a reference for path loss measurement to be Macro eNB) and transmits SRS with the configured transmission power to base station 300.

In ST206, base station 300 receives the SRS transmitted from terminal 400 in ST205. This SRS is used to select a transmission point used, for example, for the uplink (that is, transmission point that receives a signal from terminal 400, transmission point to be subjected to control of coordinated reception by a plurality of transmission points).

For example, in ST206, suppose receiving quality of SRS at Macro eNB and LPN1 out of receiving quality of SRS observed at the respective transmission points of Macro eNB, LPN1, LPN2 and LPN3 (SRS transmitted from terminal 400) is good. In this case, base station 300 configures (updates) the two transmission points of Macro eNB and LPN1 as some TPs. That is, base station 300 includes the two transmission points of Macro eNB and LPN1 in the partial TP information. For example, when the CSI-RS configuration is indicated in order of "CSI of Macro eNB, LPN1, LPN2 and LPN3," the partial TP information is expressed by a bit-map "1, 1, 0, 0, 0." That is, some transmission points (partial TP information) limited as a reference for path loss measurement are defined as transmission points of a reference for path loss calculation and path loss calculation on these transmission points is expressed as an operation of path loss measurement including CoMP control.

In ST207, base station 300 indicates the updated partial TP information (that is, information indicating the update of transmission point of the reference for path loss calculation) to terminal 400 using MAC CE. In this case, upon receipt of an ACK response to the physical channel that has indicated the MAC CE, base station 300 determines that the transmission point of the reference for path loss calculation has been appropriately updated in terminal 400.

In ST208, base station 300 transmits CSI-RS configured in base station 300 to terminal 400 in the same way as in ST202.

In ST209, base station 300 assigns an uplink data signal (PUSCH) to terminal 400. In this case, base station 300 assigns PUSCH to terminal 400 assuming that transmission power control using a measured path loss regarding a transmission point indicated in the partial TP information.

Upon receipt of a PUSCH assignment signal in ST209, in ST210, terminal 400 performs path loss measurement on transmission point candidates (transmission points of a reference for path loss calculation, Macro eNB, LPN1) indicated in the partial TP information received in ST207 using CSI-RS from each transmission point including the CSI-RS received in ST208. That is, terminal 400 performs path loss measurement on CSI-RS from some transmission points based on the partial TP information.

More specifically, in ST210, terminal 400 measures RSRP using CSI-RS from Macro eNB and CSI-RS from LPN1 respectively. Next, terminal 400 estimates path losses for Macro eNB and LPN1 respectively according to equation 5 using the measured RSRP. Next, terminal 400 calculates an average value of path loss of Macro eNB and path loss of LPN1 according to equation 6 using the estimated path losses. That is, terminal 400 assumes the measured value of RSRP corresponding to the transmission points (Macro eNB and LPN1) indicated in the partial TP information as a reference for path loss measurement.

In ST211, terminal 400 configures transmission power of PUSCH (e.g., equation 4) using the path loss measured in ST210 (path loss measured assuming Macro eNB and LPN1 as references for path loss measurement). Terminal 400 then transmits PUSCH to base station 300 according to the assignment of PUSCH received in ST209 and the configured transmission power.

In ST212, base station 300 demodulates the PUSCH received in ST211.

Here, as shown in FIG. 13, with regard to SRS received in ST213 (SRS transmitted from terminal 400), suppose the SINR value of LPN2 becomes greater than a predetermined value (default threshold) and base station 300 detects that receiving quality of an uplink signal arriving from terminal 400 at LPN2 has become better. In this case, base station 300 updates the transmission point candidates (that is, partial TP information) of the reference for path loss calculation. For example, base station 300 adds LPN2 to the transmission point candidates (partial TP information) of the reference for path loss calculation. In this case, for example, the partial TP information is expressed by a bit-map "1, 1, 1, 0, 0." In ST214, base station 300 indicates the updated partial TP information (that is, information indicating an update of the transmission point candidates of a reference for path loss calculation) to terminal 400 using MAC CE. In this case, upon receipt of an ACK response to a physical channel used to indicate MAC CE, base station 300 determines that terminal 400 has appropriately updated the transmission point candidates of a reference for path loss calculation.

In ST215, base station 300 transmits the CSI-RS configured in base station 300 to terminal 400 in the same way as in ST202. In ST216, base station 300 assigns PUSCH to terminal 400. In ST217, terminal 400 performs path loss measurement on transmission point candidates indicated in the partial TP information received in ST214 (transmission points indicated as references for path loss calculation, Macro eNB, LPN1 and LPN2) using CSI-RS from each transmission point including the CSI-RS received in ST215. In ST218, terminal 400 configures transmission power (e.g., equation 4) using the path loss measured in ST217 (path losses measured assuming Macro eNB, LPN1 and LPN2 as references for path loss measurement) and transmits PUSCH to base station 300 with the configured transmission power. In ST219, base station 300 demodulates the PUSCH received in ST218.

Hereinafter, base station 300 and terminal 400 repeat the above-described processing.

In this way, in base station 300, configuration section 101 configures a plurality of transmission points, and at least one of some transmission points of the plurality of transmission points, transmission processing section 104 transmits TP candidate information indicating the plurality of transmission points and partial TP information indicating some transmission points to terminal 400, reception processing section 108 receives uplink signals transmitted with transmission power configured in terminal 400, and reception processing section 108 combines the uplink signals received at the some transmission points indicated in the partial TP information. Here, the transmission power is configured based on a path loss (third channel information) estimated using CSI-RS (second channel information) corresponding to CSI-RS from some transmission points indicated in the partial TP information among CSI-RSs (first channel information) respectively corresponding to a plurality of CSI-RSs from the plurality of transmission points indicated in the TP candidate information. In terminal 400, reception processing section 203 receives a plurality of CSI-RS from a plurality of transmission points, TP candidate information indicating a plurality of transmission points and partial TP information indicating at least one of some transmission points of the plurality of transmission points, CSI generating section 206 generates RSRP (first channel information) respectively corresponding to a plurality of CSI-RSs from the plurality of transmission points based on TP candidate information, path loss estimation section 401 estimates path loss (third channel information) using RSRP (second channel information) corresponding to CSI-RS from the some transmission points indicated in the partial TP information, and transmission signal forming section 208 transmits uplink signals with transmission power configured based on the estimated path loss.

Furthermore, terminal 400 configures transmission power of each uplink signal (SRS, PUSCH, PUCCH) using an average value of path losses respectively corresponding to some transmission points indicated in the partial TP information (transmission point for uplink CoMP control). This allows terminal 400 to configure a transmission power set value taking into account signal quality obtained by combining signals among transmission points of CoMP control. That is, terminal 400 can perform transmission power control taking into account an improvement of receiving quality (combined gain) obtained by applying uplink CoMP control. Base station 300 receives uplink signals from terminal 400 at transmission points indicated in the partial TP information (transmission points for uplink CoMP control) and combines uplink signals among the transmission points to detect the signal. Thus, it is possible to reflect an improvement of receiving quality obtained through coordinated reception in transmission power control and prevent necessary transmission power from increasing. Thus, it is possible to reduce large interference provided to transmission points whose path loss is not minimum and prevent suppression to the capacity.

MAC CE used to indicate the partial TP information can indicate information at an optional timing and can indicate information with less delay than RRC control (RRC signaling). Thus, according to the present embodiment, by updating the partial TP information using MAC CE, it is possible to perform dynamic switching of the partial TP information (transmission points for uplink CoMP control) for terminal 400 without delays.

The TP candidate information is previously indicated from base station 300 to terminal 400, and terminal 400 measures RSRP using CSI-RSs from a plurality of transmission points indicated in the TP candidate information. That is, terminal 400 can perform long-time averaging processing regarding measured RSRP using CSI-RSs from a plurality of transmission point regardless of switching between transmission points of reference for path loss calculations. Even when transmission points for uplink CoMP control are switched through an update of partial TP information using MAC CE, terminal 400 can perform path loss estimation using RSRP with high accuracy (using, for example, higher layer filtered RSRP shown in equation 5) without delays.

It should be noted that the present embodiment has described the operation (equation 2) of averaging path losses among some transmission points when calculating a path loss, but the present invention is not limited to this.

For example, instead of averaging path losses, an operation of using a maximum path loss among respective path losses of some transmission points may be used. That is, transmission power of uplink signals is configured using a maximum path loss (worst value) among path losses respectively corresponding to the some transmission points. This makes it possible to cause signals to reach a transmission point located farthest from terminal 400 among transmission points participating in coordinated reception and provide more stable communication quality in the uplink.

Alternatively, instead of averaging path losses, an operation of using a minimum path loss among respective path losses of the some transmission points may be used. That is, the transmission power of uplink signals is configured using a minimum path loss (best value) among path losses respectively corresponding to some transmission points. This makes it possible to cause signals to reach a transmission point located nearest from terminal 400 among transmission points participating in coordinated reception, while making it more difficult for signals to reach other transmission points and reduce interference with signals of other terminals to be multiplexed. Furthermore, since transmission power can be minimized while keeping receiving quality, it is possible to reduce current consumption in terminal 400.

Furthermore, instead of averaging path losses, an operation of using, for example, a mean value of path losses (median, that is, a value positioned in the center when path losses are arranged in descending order) among the respective path losses of some transmission points. That is, transmission power of uplink signals is configured using a mean value (median) of path losses respectively corresponding to the some transmission points. In reception processing of transmission points participating in coordinated reception, this equivalently realizes transmission power when equal gain combining is assumed, and can thereby maximize the gain of coordinated reception.

Furthermore, a case has been described in the present embodiment where TP candidate information and partial TP information are indicated as in the case of Embodiment 1, that is, when information is indicated as information common to the uplink and downlink. However, in the present embodiment, TP candidate information and partial TP information may be configured and indicated as information that differs between the uplink and downlink. Alternatively, for example, TP candidate information may be configured to be common to the uplink and downlink and partial TP information may be configured individually in the uplink and downlink. This makes it possible to individually perform control over transmission points appropriate for coordinated transmission by a plurality of transmission points in the downlink and control over transmission points appropriate for coordinated reception by a plurality of transmission points in the uplink. It is thereby possible to individually optimize CoMP control in the uplink and downlink taking into account features such as a traffic situation of the uplink and downlink, propagation path situation or difference in transmission power among respective transmission points or the like.

[Embodiment 7]

In the present embodiment, terminal 400 (FIG. 12) changes coefficients relating to path losses used to configure transmission power control in accordance with the number of transmission points indicated as some transmission points.

More specifically, as shown in equation 2 and equation 4, transmission power of uplink signals (SRS and PUSCH) is configured using a value obtained by multiplying path loss $PL\_c$ by weighting factor $\alpha_c$ representing a compensation ratio of path loss.

In the present embodiment, the weighting factor representing a compensation ratio of path loss is assumed to be a coefficient that increases in proportion to the number of transmission points indicated as some transmission points in addition to the parameter (that is, parameter $\alpha_c$ configured from base station 300) indicated from base station 300 (FIG. 11) together with the indication of transmission point candidates. A configuration example of weighting factor $\alpha_c'$ representing a compensation ratio of path loss in the present embodiment is shown in the following equation.

$$\alpha_c'(j) = \min(1, \alpha_c(j) + (\text{num}TP-1)*0.1) \ldots \quad \text{(Equation 7)}$$

In equation 7, numTP represents the number of transmission points indicated as some transmission points. That is, the greater the number of transmission points numTP, the greater the value of weighting factor $\alpha_c'$. That is, the greater the number of transmission points numTP, the greater the influence of the value of path loss $PL\_c$ on the calculation of the transmission power set value ($P_{SRS,c}$ and $P_{PUSCH,c}$) in equations 2 and 4.

It should be noted that the value of $\alpha_c$ shown in equation 7 together with partial TP information may be explicitly indicated and base station 300 may directly instruct which of {0, 0.4, 0.5, 0.6, 0.7, 0.8, 0.9, 1} should be used using, for example, 3 bits.

There is a feature that the greater the number of transmission points used for path loss calculation, the higher the path loss estimation accuracy becomes by a diversity effect. That is, in the present embodiment, terminal 400 can configure transmission power of uplink signals (SRS or PUSCH) in accordance with the path loss estimation accuracy by a diversity effect depending on the number of transmission points numTP. That is, terminal 400 can dynamically control path loss at the time of coordinated reception by a plurality of transmission points (weighting factor representing a compensation ratio of path loss) in such a way that the path loss takes a value in accordance with the number of transmission points (the number of transmission points for coordinated reception by a plurality of transmission points). This makes it possible to prevent an increase in the required transmission power of uplink signals.

The present embodiment may also adopt a configuration whereby the value of referenceSignalPower shown in equation 5 is indicated explicitly. Even when a transmission power configuration is performed which differs from one transmission point to another indicated as a TP candidate, the absolute value of path loss values can be calculated based on the same understanding between base station 300 and terminal 400 and the accuracy of transmission power control can be secured.

[Embodiment 8]

A case will be described in the present embodiment where a method of calculating path loss is changed according to a channel type. That is, the present embodiment individually configures a path loss calculation method for each channel type (SRS, PUCCH, PUSCH) regarding the transmission power set values shown in equation 2, equation 3 and equation 4. In other words, the present embodiment changes a path loss used to configure transmission power of an uplink signal among path losses corresponding to some transmission points indicated in partial TP information in accordance with the channel type of the uplink signal.

A path loss calculation method in accordance with the magnitude of a required SNR (Signal to Noise Ratio) of each channel will be described as an example.

For PUCCH having a relatively high required SNR, a maximum path loss is used among path losses respectively corresponding to transmission points indicated in partial TP information as $PL\_c$ shown in equation 3 so that PUCCH arrives at all transmission points used for coordinated reception by a plurality of transmission points.

On the other hand, for SRS and PUSCH having a relatively low required SNR, a minimum path loss is used among path losses respectively corresponding to transmission points indicated in partial TP information as $PL\_c$ shown in equations 2 and 4.

As another example, a path loss calculation method in accordance with whether or not interference with other terminals occurs will be described.

For PUCCH that causes interference with signals of other terminals, a minimum path loss is used among path losses respectively corresponding to transmission points indicated in partial TP information as $PL\_c$ shown in equation 3 so that PUCCH arrives at only transmission points located near terminal 400.

On the other hand, for SRS and PUSCH in which interference with signals of other terminals can be avoided through frequency scheduling or parameter configuration or the like, a maximum path loss is used among path losses respectively corresponding to transmission points indicated in partial TP information as $PL\_c$ shown in equations 2 and 4 so that SRS and PUSCH arrive at all transmission points used for coordinated reception by a plurality of transmission points.

As a further example, a path loss calculation method in accordance with parameters configured using each uplink signal will be described. It should be noted that Type0 SRS which will be described later is SRS periodically transmitted and Type1 SRS is SRS whose transmission timing is controlled by a trigger.

A transmission point indicated in partial TP information configures parameters of coordinated reception by a plurality of transmission points using Type1 SRS from terminal 400. Therefore, for Type1 SRS used to configure parameters of coordinated reception by a plurality of transmission points, since a combined gain through coordinated reception by a plurality of transmission points cannot be considered, a maximum path loss is used among path losses respectively corresponding to transmission points indicated in partial TP information as PL_c shown in equations 2 and 4 so that Type1 SRS arrives at all transmission points indicated in partial TP information.

On the other hand, for Type° SRS used for parameter selection of PUSCH or PUSCH, since a combined gain through coordinated reception by a plurality of transmission points can be considered, an average value of path losses respectively corresponding to transmission points indicated in partial TP information is used as PL_c shown in equation 2 and equation 4.

As described so far, by dynamically controlling the range within which the uplink signals can reach in accordance with application for each channel type of the uplink signals, it is possible to avoid an increase in required transmission power and reduce interference with other terminals.

[Embodiment 9]

In the present embodiment, Reference TP is indicated by MAC CE for indicating partial TP information.

Here, Reference TP is information that identifies a generation of RSRP or referenceSignalPower in equation 5 and indicates a transmission point to be used as a reference for path loss calculation.

More specifically, when indicating information on transmission point candidates (TP candidate information and partial TP information) to terminal 400 (FIG. 12), base station 300 (FIG. 11) explicitly indicates which transmission point Reference TP of terminal 400 is to terminal 400 using a predetermined number of bits of MAC CE.

For example, FIG. 14 illustrates a configuration of MAC CE according to the present embodiment. The MAC CE shown in FIG. 14 is composed of 16 bits.

In FIG. 14, 12 bits out of 16 bits respectively indicate whether or not transmission point candidates $T_1$ to $T_{12}$ which can be connection destinations of terminal 400 are some transmission points (transmission points for uplink CoMP control, that is, CoMP reception points of coordinated reception by a plurality of transmission points).

On the other hand, in FIG. 14, the remaining 4 bits other than the 12 bits indicating transmission point candidates indicate Reference TP (Reference $TP_i$) of terminal 400. For example, any one of transmission point candidates $T_1$ to $T_{12}$ shown in FIG. 14 is configured as Reference $TP_i$ shown in FIG. 14.

Terminal 400 (reception processing section 203) receives Reference $TP_i$ indicating a transmission point used as a reference for path loss calculation intended for terminal 400 at a region (remaining 4 bits) other than the region (12 bits) to which partial TP information is assigned among the 16 bits in MAC CE (indication region) having a predetermined size (corresponding to 16 bits). Upon receipt of MAC CE, terminal 400 checks resources to which Reference TP in MAC CE is assigned and identifies Reference TP of terminal 400 (transmission point used as a reference for path loss calculation).

For example, terminal 400 configures transmission power of signals transmitted by a transmission point corresponding to the Reference TP indicated by MAC CE as referenceSignalPower shown in equation 5 (parameter of a transmission point serving used as a reference). Terminal 400 then estimates path losses using respective RSRPs corresponding to some transmission points of transmission point candidates $T_1$ to $T_{12}$ indicated by MAC CE (higher layer filtered RSRP shown in equation 5) and referenceSignalPower.

MAC CE can indicate information at an optional timing and can also indicate information with less delay than RRC control (RRC signaling). Thus, according to the present embodiment, it is possible to dynamically switch between Reference TPs of terminal 400 without delays through indication of Reference TP using MAC CE and thereby prevent an increase in required transmission power.

[Embodiment 10]

A case will be described in the present embodiment where correction terms $P_{O\_PUCCH}$ and $P_{O\_PUSCH,c}$ used to configure transmission power are indicated by MAC CE for indicating partial TP information and the indicated correction terms $P_{O\_PUCCH}$ and $P_{O\_PUSCH,c}$ are used in equation 2, equation 3 and equation 4.

More specifically, when indicating information on transmission point candidates (TP candidate information and partial TP information) to terminal 400 (FIG. 12), base station 300 (FIG. 11) explicitly indicates correction terms $P_{O\_PUCCH}$ and $P_{O\_PUSCH,c}$ of transmission power control of terminal 400 to terminal 400 using a predetermined number of bits of MAC CE. Here, correction terms $P_{O\_PUCCH}$ and $P_{O\_PUSCH,c}$ are parameters configured in accordance with a transmission point used as a reference for a transmission power configuration.

For example, FIG. 15 illustrates a configuration of MAC CE according to the present embodiment. The MAC CE shown in FIG. 15 is composed of 16 bits.

In FIG. 15, 8 bits out of 16 bits respectively indicate whether or not transmission point candidates $T_1$ to $T_{12}$ which can be connection destinations of terminal 200 are some transmission points (transmission points for uplink CoMP control, that is, CoMP reception points of coordinated reception by a plurality of transmission points).

On the other hand, in FIG. 15, the remaining 8 bits other than the 8 bits indicating transmission point candidates among 16 bits indicate correction terms P 0 PUCCH and $P_{O\_PUSCH,c}$ used by terminal 400 for transmission power control. For example, correction terms $P_{O\_PUCCH}$ and $P_{O\_PUSCH,c}$ shown in FIG. 15 are expressed using 4 bits each.

As an example, the set value of $P_{O\_UE\_PUSCH,c}$ individually added to each terminal 400 among parameters configured by base station 300 shown in the following expression may be indicated using 4 bits and which value of, for example, {−8, −7, . . . , 6, 7} should be taken may be explicitly indicated. Here, $P_{O\_NOMINAL\_PUSCH,c}$ in the equation is a value configured by the base station as a parameter common to cells.

$$P_{O\_PUSCH,c}(j) = P_{O\_NOMINAL\_PUSCH,c}(j) + P_{O\_UE\_PUSCH,c}(j) \ldots \quad \text{(Equation 8)}$$

Similarly, the set value of $P_{O\_UE\_PUCCH}$ individually assigned to each terminal 400 among parameters configured by base station 300 shown in the following expression may be indicated using 4 bits and which value of, for example, {−8, −7, . . . , 6, 7} should be taken may be explicitly indicated. Here, $P_{O\_NOMINAL\_PUCCH}$ in the equation is a value configured by the base station as a parameter common to cells.

$$P_{O\_PUCCH} = P_{O\_NOMINAL\_PUCCH} + P_{O\_UE\_PUCCH} \ldots \quad \text{(Equation 9)}$$

MAC CE can indicate information at an optional timing and can indicate information with less delay than RRC control (RRC signaling). Thus, according to the present embodiment, by indicating transmission power control correction terms using MAC CE, it is possible to perform dynamic switching between transmission power reference values of terminal 400 without delays and prevent an increase in required transmission power.

[Other Embodiments]

(1) In each of the embodiments, a description has been provided with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an array antenna including a plurality of antennas and/or the like.

For example, in 3GPP LTE, how many physical antennas are included in the antenna port is not defined, but the antenna port is defined as the minimum unit allowing the base station to transmit different reference signals.

In addition, an antenna port may be specified as a minimum unit to be multiplied by a precoding vector weighting.

(2) In the foregoing embodiments, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosures of the specifications, the drawings, and the abstracts included in Japanese Patent Application No. 2011-171711, filed on Aug. 5, 2011, and Japanese Patent Application No. 2011-217279, filed on Sep. 30, 2011 are incorporated herein by reference in their entirety.

INDUSTRIAL APPLICABILITY

The present invention is useful in that it is possible to prevent an increase in transmission power necessary to transmit a CSI report in a terminal while securing a wide range of mobility control candidates.

REFERENCE SIGNS LIST 100, 300 Base station
101 Configuration section
102, 103 Coding and modulation section
104 Transmission processing section
105, 209 Transmitting section
106, 201 Antenna
107, 202 Receiving section
108, 203 Reception processing section
109 Data receiving section
110 CSI receiving section
200, 400 Terminal
204 Reference signal generating section
205 Data signal generating section
206 CSI generating section
207 Transmission control section
208 Transmission signal forming section
301 Inter-TP interface
401 Path loss estimation section

The invention claimed is:

1. A terminal comprising:
a receiving section that receives a plurality of reference signals from a plurality of transmission points, first information indicating the plurality of transmission points and second information indicating at least one of some of the plurality of transmission points;
a generating section that generates a first channel state information (CSI) part including CSI respectively corresponding to the plurality of reference signals from the plurality of transmission points indicated by the first information and that generates a second CSI part including CSI corresponding to the reference signals from the some transmission points indicated by the second information, the first CSI part being used for updating the second information, and the second CSI part being used for control of coordinated transmission; and
a transmitting section that transmits the generated first CSI part and the generated second CSI part, wherein
the receiving section receives the first information through a radio resource control (RRC) signaling, and receives the second information through MAC control element (MAC CE);
the transmitting section transmits the first CSI part with lower frequency than a transmitting frequency of the second CSI part; and
the generated first CSI part includes a third CSI part corresponding to the reference signal from a transmission point not included in the some transmission points and a forth CSI part corresponding to the reference signal from the some transmission points, the third CSI part including wideband channel quality indicator (CQI) and not including precoding matrix indicator (PMI) and Rank indicator (RI), the forth CSI part including narrowband CQI, PMI and RI, and an amount of the third CSI part is smaller than an amount of the fourth CSI part.

2. The terminal according to claim 1, wherein information indicating the some transmission points is bit-map based information indicating which transmission points of the plurality of transmission points are the some transmission points.

3. The terminal according to claim 1, wherein one reference signal is configured for each of the plurality of transmission points.

4. The terminal according to claim 1, wherein a plurality of reference signals are configured for the one transmission point.

5. The terminal according to claim 1, wherein the some transmission points are a predetermined number of transmission points having better CSI among the plurality of transmission points.

6. The terminal according to claim 1, wherein the some transmission points are transmission points to be subjected to control of coordinated transmission by a plurality of transmission points among the plurality of transmission points.

7. The terminal according to claim 1, wherein the reference signals include at least a reference signal for demodulating a downlink control channel.

8. The terminal according to claim 1, wherein:
the second information is indicated using a predetermined indication region; and
the receiving section receives information indicating a transmission point which is a sender of a downlink control signal intended for the terminal in a region other than the region assigned the second information out in the indication region.

9. The terminal according to claim 1, further comprising an estimation section that estimates a path loss value using the second CSI part, wherein
the transmitting section transmits an uplink signal with transmission power configured based on the estimated path loss value.

10. The terminal according to claim 9, wherein the some transmission points are transmission points to be subjected to control of coordinated reception by a plurality of transmission points among the plurality of transmission points.

11. The terminal according to claim 9, wherein the transmission power is configured using an average value of a plurality of path loss values respectively corresponding to the some transmission points.

12. The terminal according to claim 9, wherein the transmission power is configured using a worst value of a plurality of path loss values respectively corresponding to the some transmission points.

13. The terminal according to claim 9, wherein the transmission power is configured using a best value of a plurality of path loss values respectively corresponding to the some transmission points.

14. The terminal according to claim 9, wherein the transmission power is configured using an intermediate value of a plurality of path loss values respectively corresponding to the some transmission points.

15. The terminal according to claim 9, wherein:
the transmission power is configured using a value obtained by multiplying the path loss value by a weighting factor; and
the weighting factor is increased as the number of the some transmission points increases.

16. The terminal according to claim 9, wherein the second CSI part used to configure the transmission power out of the path loss value respectively corresponding to the some transmission points differs depending on the type of the uplink signal.

17. The terminal according to claim 9, wherein:
the path loss value is estimated from the second CSI part and a parameter of a transmission point used as a reference for calculation of the path loss value;
the second information is indicated using a predetermined indication region; and
the receiving section receives information indicating the transmission point used as a reference in a region other than the region assigned the second information in the indication region.

18. The terminal according to claim 9, wherein:
the second information is indicated using a predetermined indication region; and
the receiving section receives information indicating a parameter used to configure the transmission power in a region other than the region assigned the second information in the indication region, and the parameter is set to a value corresponding to the transmission point used as a reference for a configuration of the transmission power.

19. A base station comprising:
a configuration section that configures a plurality of transmission points and at least one of some of the plurality of transmission points;
a transmitting section that transmits to a terminal, first information indicating the plurality of transmission points and second information indicating the some transmission points; and
a receiving section that receives a first channel state information (CSI) part including CSI respectively corresponding to a plurality of reference signals from the plurality of transmission points generated in the terminal based on the first information, and a second CSI part including CSI corresponding to reference signals from the some transmission points generated in the terminal based on the second information, the first CSI part being used for updating the second information, and the second CSI part being used for control of coordinated transmission, wherein
the transmitting section transmits the first information through a radio resource control (RRC) signaling, and transmits the second information through MAC control element (MAC CE);
the receiving section receives the first CSI part with lower frequency than a receiving frequency of the second CSI part; and
the received first CSI part includes a third CSI part corresponding to the reference signal from a transmission point not included in the some transmission points and a forth CSI part corresponding to the reference signal from the some transmission points, the third CSI part including wideband channel quality indicator (CQI) and not including precoding matrix indicator (PMI) and Rank indicator (RI), the forth CSI part including narrowband CQI, PMI and RI, and an amount of the third CSI part is smaller than an amount of the fourth CSI part.

20. A transmission method comprising:
receiving a plurality of reference signals from a plurality of transmission points;
receiving first information indicating the plurality of transmission points;
receiving second information indicating at least one of some of the plurality of transmission points;
generating a first channel state information (CSI) part including CSI respectively corresponding to the plurality of reference signals from the plurality of transmission points indicated by the first information and generating a second CSI part including CSI corresponding to the reference signals from the some transmission points indicated by the second information, the first CSI part being used for updating the second information, and the second CSI part being used for control of coordinated transmission; and
transmitting the generated first CSI part and the second CSI part, wherein
the first information is received through a radio resource control (RRC) signaling, and the second information is received through MAC control element (MAC CE);
the first CSI part is transmitted with lower frequency than a transmitting frequency of the second CSI part; and
the generated first CSI part includes a third CSI part corresponding to the reference signal from a transmission point not included in the some transmission points and a forth CSI part corresponding to the reference signal from the some transmission points, the third CSI part including wideband channel quality indicator (CQI) and not including precoding matrix indicator (PMI) and Rank indicator (RI), the forth CSI part including narrowband CQI, PMI and RI, and an amount of the third CSI part is smaller than an amount of the fourth CSI part.

21. A reception method comprising:

configuring a plurality of transmission points and transmitting first information indicating the plurality of transmission points to a terminal;

receiving a first channel state information (CSI) part including CSI respectively corresponding to a plurality of reference signals from the plurality of transmission points generated in the terminal based on the first information;

configuring at least one of some of the plurality of transmission points and transmitting second information indicating the some transmission points to the terminal; and receiving a second CSI part including CSI corresponding to reference signals from the some transmission points generated in the terminal based on the second information, the first CSI part being used for updating the second information, and the second CSI part being used for control of coordinated transmission, wherein the first information is transmitted through a radio resource control (RRC) signaling, and the second information is transmitted through MAC control element (MAC CE);

the first CSI part is received with lower frequency than a receiving frequency of the second CSI part; and the received first CSI part includes a third CSI part corresponding to the reference signal from a transmission point not included in the some transmission points and a forth CSI part corresponding to the reference signal from the some transmission points, the third CSI part including wideband channel quality indicator (CQI) and not including precoding matrix indicator (PMI) and Rank indicator (RI), the forth CSI part including narrowband CQI, PMI and RI, and an amount of the third CSI part is smaller than an amount of the fourth CSI part.

* * * * *